US009855518B2

(12) United States Patent
Wright et al.

(10) Patent No.: US 9,855,518 B2
(45) Date of Patent: Jan. 2, 2018

(54) METHOD AND APPARATUS FOR A VERTICAL LIFT DECANTER SYSTEM IN A WATER TREATMENT SYSTEM

(71) Applicant: ClearCove Systems, Inc., Rochester, NY (US)

(72) Inventors: Terry Wright, Rochester, NY (US); Tim Cornelison, Saugerties, NY (US); Markus Bauer, Pittsford, NY (US); Arvid Abrams, Fort Plain, NY (US)

(73) Assignee: ClearCove Systems, Inc., Victory, NY (US)

( * ) Notice: Subject to any disclaimer, the term of this patent is extended or adjusted under 35 U.S.C. 154(b) by 529 days.

(21) Appl. No.: 14/142,197

(22) Filed: Dec. 27, 2013

(65) Prior Publication Data

US 2015/0183658 A1 Jul. 2, 2015

(51) Int. Cl.
*C02F 1/00* (2006.01)
*B01D 21/34* (2006.01)
(Continued)

(52) U.S. Cl.
CPC ......... *B01D 21/34* (2013.01); *B01D 21/0006* (2013.01); *B01D 21/0012* (2013.01); *B01D 21/2427* (2013.01); *B01D 21/2444* (2013.01); *C02F 2001/007* (2013.01); *C02F 2209/005* (2013.01); *C02F 2209/03* (2013.01); *C02F 2209/40* (2013.01); *C02F 2209/42* (2013.01); *C02F 2303/24* (2013.01); *Y02W 10/37* (2015.05)

(58) Field of Classification Search
None
See application file for complete search history.

(56) References Cited

U.S. PATENT DOCUMENTS 2,401,745 A 6/1946 Brown
2,799,396 A 7/1957 Belaskas
(Continued)

FOREIGN PATENT DOCUMENTS

EP 0010395 A1 4/1980
EP 1 369 156 A1 12/2003
(Continued)

OTHER PUBLICATIONS

"Vortex Grit Chamber KD 01.5", Dec. 17, 2013 (Dec. 17, 2013), X P055236807 Retrieved from the Internet: URL: http://www.dwe.dk/files/files/produkter/KD01-5_bro_GB.pdf [retrieved on Dec. 16, 2015] p. 2; figure 1, 2.
(Continued)

*Primary Examiner* — Michael H Wilson
*Assistant Examiner* — Katherine Will
(74) *Attorney, Agent, or Firm* — Harris Beach PLLC; Neal L. Slifkin

(57) ABSTRACT

The present invention relates to a vertically adjustable screened decanter system to replace prior art stationary or pivoting effluent weirs in water clarifiers and settling basins. The screened decanter has no physical weir and relies instead on maintaining a desired flow rate by controllably varying the depth of immersion of a screened box. The decanter is periodically raised into a hood that provides spray cleaning and disinfection of the screened box. The system is capable of removing up to 85% of the BOD in a wastewater stream.

19 Claims, 29 Drawing Sheets

(51) Int. Cl.
*B01D 21/00* (2006.01)
*B01D 21/24* (2006.01)

(56) References Cited

U.S. PATENT DOCUMENTS

| | | | |
|---|---|---|---|
| 3,006,474 A | 10/1961 | Elliott | |
| 3,372,715 A | 3/1968 | Ashton | |
| 3,717,257 A | 2/1973 | Boyle | |
| 3,957,655 A | 5/1976 | Barefoot | |
| 3,964,512 A | 6/1976 | Dumas | |
| 3,997,198 A | 12/1976 | Linder | |
| 4,009,106 A | 2/1977 | Smith | |
| 4,192,746 A | 3/1980 | Arvanitakis | |
| 4,202,372 A | 5/1980 | Gibbons | |
| 4,226,714 A | 10/1980 | Furness | |
| 4,367,145 A | 1/1983 | Simpson | |
| 4,405,458 A | 9/1983 | McHugh, Jr. | |
| 4,474,213 A | 10/1984 | Jameson | |
| 4,608,165 A | 8/1986 | Galper | |
| 4,715,570 A | 12/1987 | Mashuda | |
| 5,205,768 A | 4/1993 | Pollack | |
| 5,290,434 A | 3/1994 | Richard | |
| 5,352,356 A * | 10/1994 | Murphy | B01D 17/0208 137/398 |
| 5,411,633 A | 5/1995 | Phillips et al. | |
| 5,951,878 A * | 9/1999 | Astrom | B01D 33/21 210/197 |
| 6,213,555 B1 | 4/2001 | La Terra | |
| 7,025,888 B2 | 4/2006 | Thompson | |
| 7,686,996 B2 | 3/2010 | Strobel et al. | |
| 7,824,549 B2 | 11/2010 | Wilcher et al. | |
| 7,972,505 B2 | 7/2011 | Wright | |
| 8,225,942 B2 | 7/2012 | Wright | |
| 8,398,864 B2 | 3/2013 | Wright | |
| 8,721,889 B2 | 5/2014 | Conner et al. | |
| 8,875,371 B2 | 11/2014 | Patten et al. | |
| 2003/0164341 A1 | 9/2003 | Use et al. | |
| 2007/0095749 A1 | 5/2007 | Komatsu | |
| 2007/0151916 A1 | 7/2007 | Knappe et al. | |
| 2008/0296228 A1 | 12/2008 | Sauvignet et al. | |
| 2009/0065957 A1 | 3/2009 | Mao et al. | |
| 2009/0095672 A1 | 4/2009 | Wilcher et al. | |
| 2010/0108594 A1 * | 5/2010 | Wright | B01D 21/0006 210/322 |
| 2010/0140190 A1 * | 6/2010 | Wright | B01D 21/0006 210/798 |
| 2010/0176054 A1 | 7/2010 | Koopmans | |
| 2010/0236999 A1 | 9/2010 | Utsunomiya | |
| 2011/0042844 A1 | 2/2011 | Brown et al. | |
| 2011/0073296 A1 | 3/2011 | Richard et al. | |
| 2011/0278212 A1 | 11/2011 | Tyner et al. | |
| 2012/0261337 A1 | 10/2012 | Weiss | |

FOREIGN PATENT DOCUMENTS

| | | |
|---|---|---|
| EP | 1700963 A1 | 9/2006 |
| GB | 1079809 A | 8/1967 |
| JP | H03 65298 A | 3/1991 |
| WO | 2011087936 A2 | 7/2011 |

OTHER PUBLICATIONS

Dango & Dienenthal Plate Filter Brochure, 2011, 6 Pages.
Communication: Extended EP Search Report for EP 14200235, dated Jan. 3, 2016, 17 Pages.
Communication: Partial EP Search Report for EP 15175703, dated Jul. 1, 2016, 10 Pages.

* cited by examiner

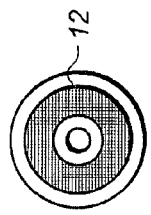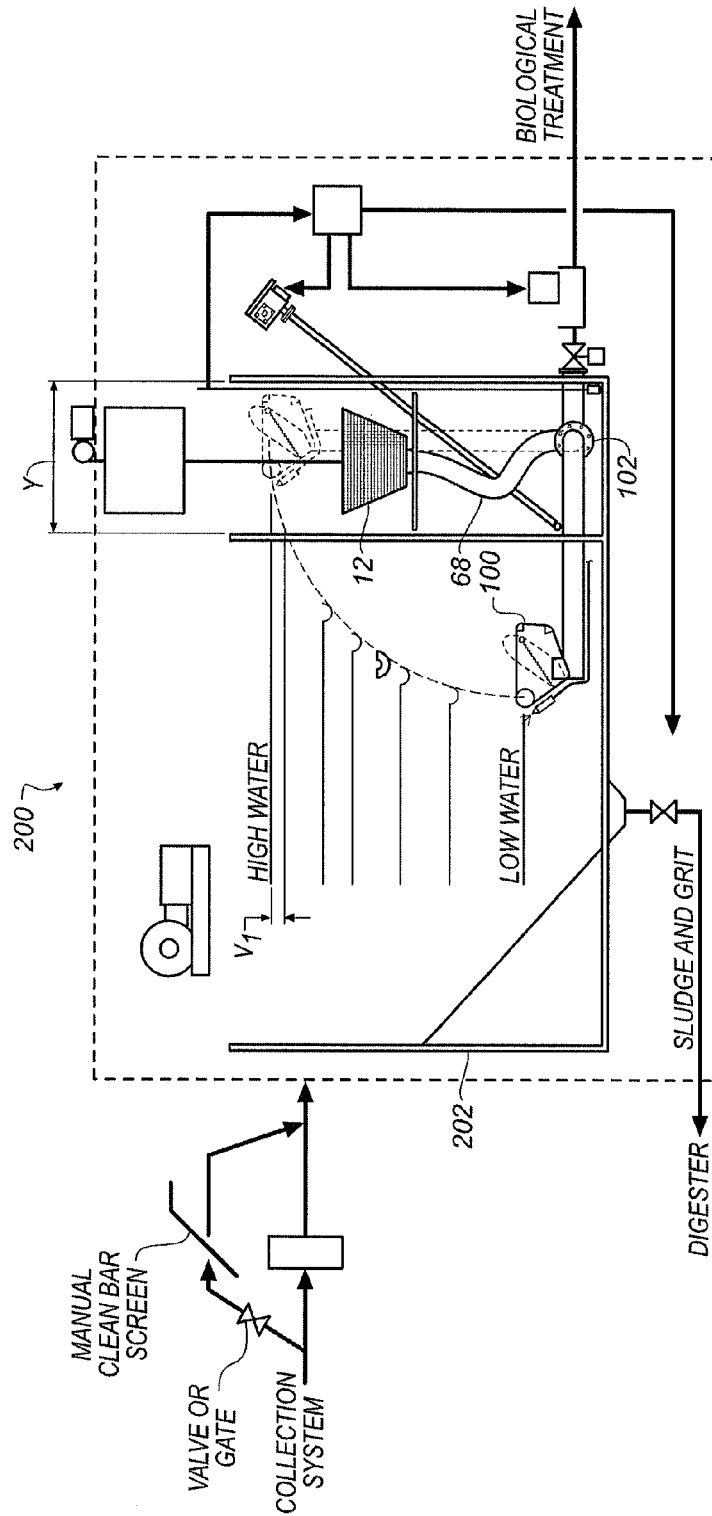
FIG. 27a
FIG. 27
(PRIOR ART)

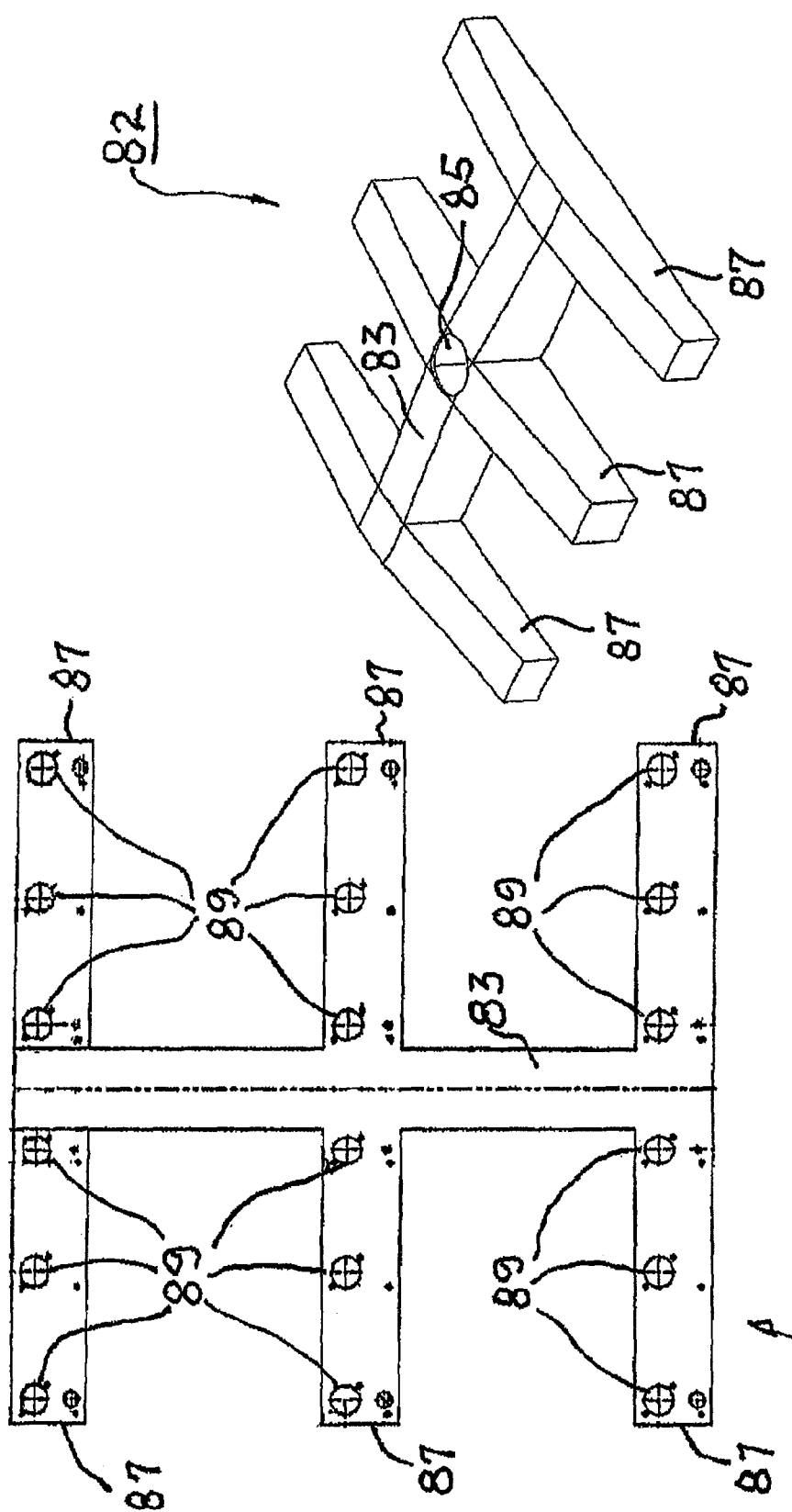

METHOD AND APPARATUS FOR A VERTICAL LIFT DECANTER SYSTEM IN A WATER TREATMENT SYSTEM

FIELD OF THE INVENTION

The present invention relates generally to the field of water treatment; more particularly, to settling tanks in water treatment systems wherein grit and dense solids are allowed to settle from the influent, and buoyant solids (fats, oil, grease, non-dense solids) are prevented from entering into an effluent decanter; and most particularly, to a vertically driven screen box assembly (SBX) comprising a screen for separating liquids from solids.

BACKGROUND OF THE INVENTION

In developed and developing countries, primary treatment and disinfection of waste water discharges from collection systems and waste water treatment facilities is the first step to improving water quality. As the countries continue to advance, secondary and tertiary waste water treatment processes are added to provide additional treatment of the primary effluent.

Primary treatment removes large solids via screening and gravitational settling to remove light and dense solids, allowing neutrally buoyant matter to pass into the secondary treatment process or receiving body of water. Primary treatment utilizing gravitational settling or clarification is recognized as removing 20-33% of the organic load as measured in Biochemical Oxygen Demand (BOD). Secondary treatment removes another 50+% of the organic load by converting the BOD to biomass (bacteria) and $CO_2$.

Secondary treatment provides an environment of adequate temperature, volume, mixing, and oxygen or the absence of oxygen in anaerobic processes to sustain the bacterial population necessary to consume the BOD and nutrients remaining in the waste water after primary treatment. New organic matter enters the treatment facility continuously so a portion of the existing bacterial population is removed from the process to promote the growth of new bacteria. The effectiveness of primary treatment directly affects secondary process or the receiving body of water if discharged from the collection system.

Primary clarifiers or settling basins are recognized as being the most economical means to reduce BOD as there is little energy required and no biomass to maintain. Primary treatment has no biomass therefore no aeration energy; no process controls to monitor the biomass to determine the health of the biomass by the types and quantity of the bacteria; no need to separate and remove or waste the bacteria by moving to a side-stream digester; no need to aerate the digester; and no need to dewater and dispose of the surplus bacteria, also called secondary sludge. The lack of complexity of primary treatment is well suited for developing nations and begins an effective recovery of their surface waters and aquifers resulting in reduced health issues.

Prior art primary clarifiers may be circular or rectangular tanks and are volumetrically and geometrically sized to provide a horizontal fluid velocity lower than the solids settling velocity. The horizontal travel time and distance of the liquid from the inlet to the effluent weir must be greater than the settling time and distance of the suspended solids so that solids settle to the bottom of the tank prior to reaching the elevated effluent weir. These settled solids contain a majority of the BOD in raw sewage. This is an important first stage because the more solids that exit the primary clarifier (or if there is no primary clarifier), the higher the BOD entering the secondary treatment process or the effluent-receiving body of water. The higher the BOD entering the secondary treatment process, the larger the required secondary process equipment and tanks, the more biomass required, generated, and disposed of, the more processing energy that must be expended. The higher the BOD of the effluent stream entering the receiving body of water the greater the eutrophication of the water body and the more detrimental to the health, due to poor disinfection.

An example based on standard design parameters to achieve 33% BOD reduction is shown as follows:

Minimum depth=10'; Surface Overflow Rate=1,000 Gallons per day (GPD)/square foot (design) and 1,500 GPD/SF (Peak); Weir Loading @ Peak Hourly=20,000 GPD/linear foot;

Use Design Flow=1,000,000 GPD (1.55 CFS); Peak Hourly=2,500,000 GPD (3.87 CFS);

Design=1,000,000 GPD/1,000 GPD/SF=1,000 SF; Peak=2,500,000/1,500=1,667 SF

Typical design seeks a length about 3 times the width so, 1,667 SF=24' wide×70' long×10' deep; Forward velocity=3.87 CFS/(10'×24')=0.016 Ft. per Second (FPS).

An EPA study provided a summary of settling data from multiple wastewater plants. The table below is an average of pertinent findings to support the design parameters as they relate to BOD reduction:

| Suspended Solids | % Primary Sewage | Organic (BOD) Content | Average Settling Velocity | % >50 microns | % BOD Reduction |
|---|---|---|---|---|---|
| Settleable (>100 microns) | 45 | 50% | 0.106 FPS | 64% | 22.5% |
| Supracolloidal (1-100 microns) | 35 | 30% |  | 68% | 0% |
| Colloidal (0.2-1.0 microns) | 20 | 20% |  | 0% | 0% |

The values in the above table are averages taken from several WWTP that include storm water, combined sewer systems, and sanitary sewage. The settleable solids have a settling velocity range from 0.016 to 0.115 FPS with an average of 0.106 FPS as stated in the table.

The design example above results in a forward velocity of 0.016 FPS which is less than the average settling velocity of 0.106 FPS. The tank is 10' deep so the solids will settle in 94 seconds. The forward distance travelled in 94 seconds is 1.5 Feet so the solids will settle before the liquid reaches the effluent weir. The EPA study expressed considerable difficult in establishing a consistent average for the supracolloidal and colloidal solids as they vary from site to site and range from 0.0007 to 0.002 FPS. The forward velocity is 0.016 FPS and the tank is 70 Ft long therefore the travel time=4, 375 seconds therefore the depth of settling is 3' to 8.75'.

The effluent weir is 2,500,000 GPD/20,000 GPD/Ft.=a minimum of 125', the tank is 24' wide therefore use 3-double sided weirs providing 144' of weir length so the flow is 2,500,000 GPD/144=17,361 GPD/Ft or 0.027 CFS/Ft. at the weir. The velocity of the liquid at 3' from the weir is 0.0057 FPS and at 8.75' the liquid velocity is 0.002 FPS. Some portion of the supracolloidal solids will be removed as per this mathematical exercise on clarifier velocities, but very little of the colloidal solids.

It would be reasonable to expect the primary clarifier in this design example to reduce the BOD to the receiving stream or secondary treatment process by 33%.

Developed and developing nations, as well as the environment, would significantly benefit from removing more than 20-33% of the organic matter from the waste water in the primary treatment because;

Less $CO_2$ would be released to the atmosphere.

Less energy consumed to convert the organic matter (BOD) to biomass (secondary sludge)

Less secondary sludge to pump, store, aerate, dewater, and send to landfill

Fewer trucks hauling secondary sludge to landfill or composting facilities

Landfills would have a longer operational life and release less methane to the atmosphere Smaller secondary treatment system would be possible resulting in significant capital costs savings for the developed and developing countries allowing more to be done sooner Lower operational and maintenance costs for the secondary treatment systems Higher quality primary effluent would accelerate improvements to the receiving waters and reduce environmental health and safety issues The higher concentration of organics in the primary sludge significantly increases the energy generation potential in anaerobic digesters. Anaerobic Digesters capture and utilize the methane gas created from the high volatile primary sludge to produce energy versus releasing most of the methane to atmosphere due to poor capture systems in landfills.

Waste water treatment plants become a renewable resource recovery facility creating more energy than they consume as the organic load to the secondary treatment process is reduced and the organic fuel for the anaerobic digesters is increased.

Anaerobic Digestion creates less bacteria and results in a Class A sludge that can be used for composting.

The organic removal rate of primary clarifiers can be improved from 33% to approximately 50% by the addition of coagulating chemicals. This improvement is called Chemically Enhanced Primary Treatment (CEPT) and CEPTs have demonstrated all of the above described benefits. There were no physical or operational modifications to the primary clarifier tank, influent flow baffle, sludge scrapper mechanisms, scum trough or effluent trough. The coagulant forms a floc or gel net that is larger and more dense than the individual suspended solids. As this floc settles it gathers some supracolloidal and colloidal particles thus reducing the BOD and suspended solids flowing to the secondary treatment process.

The Ballasted Floc Reactor (BFR) followed the CEPT in an attempt to remove more BOD and reduce capital costs. The BFR technology removes approximately 50% of the BOD, the same as CEPT, but with a smaller clarifier because the solid settling rate is much higher.

Developing nations would likely not be able to see the benefits of enhanced BOD reduction with the CEPT or BFR products because the chemicals and skilled operators may not be available.

In summary, conventional primary clarifiers, BFRs and CEPTs do not have screened effluent weirs to retain the supracolloidal and colloidal organic particles. Simple placement of a screen at existing effluent weirs will not work because a) such screens would foul in a short time frame due to the high flow velocity at the weir design liquid flow velocities; b) such screens would be stationary so there is no backwashing; and c) such screen would foul due to organic growth on the screen since the screen is in the liquid all of the time. The forward velocity from the inlet to the effluent weir is constant so there is an inertia imparted into the solids keeping them moving towards the effluent weir; there is no velocity control within the tank as the tank is always full so if 10 gallons of liquid enters the tank, 10-gallons of liquid must exit the tank at the same rate as it was added; and the sludge removal equipment in the tank is continually moving and disturbing the settled sludge creating eddies that keep neutrally buoyant constituents and colloidals in suspension moving towards the effluent weir at a high effluent weir entrance velocity.

A screened decanter comprising an effluent weir is disclosed in U.S. Pat. Nos. 7,972,505 and 8,398,864, the relevant disclosures of which are incorporated herein by reference. The movement of a screened decanter is an arc rotating about a pivot. The vertical movement of the screened decanter about a pivot comprises both horizontal and vertical movement in the direction of motion. Depending upon the depth of the tank, the length of the pivot arm requires that the decanter assembly occupy a relatively large footprint in the tank.

What is needed in the art is a screen assembly in the form of a rectangular box or cylinder that is controllably driven in the vertical direction to optimize the exposure of the screen to the wastewater to varying wastewater levels and that can be lifted from the wastewater for backflushing and sterilization in a dedicated overhead apparatus. Because the motion of the screen assembly is only vertical, the required footprint can be relatively small.

What is further needed is an assembly comprising a ganged plurality of such screen box assemblies for wastewater systems having high flows, limited surface area, and/or shallow active tank volumes.

It is a principal object of the invention to provide a high and constant effluent flow rate from a wastewater treatment facility over a wide range of influent flow rates.

SUMMARY OF THE INVENTION

Briefly described, the present invention provides a screen assembly in the form of a rectangular box or cylinder that is controllably driven in the vertical direction to optimize the exposure of the screen to the wastewater to varying wastewater levels in a wastewater clarifier and that can be lifted from the wastewater for backflushing and sterilization in a dedicated overhead apparatus.

A screen box ("SBX") assembly in accordance with the present invention comprises an ultrafine screen; a screen frame of flat plate and hollow tubing that incorporates air scouring at the lowest elevation of the screen, the frame being sealed to prevent liquids and solids from bypassing the screen so all must pass through the screen; a flexible discharge hose that may have swivel joints or may extend and compress in an accordion fashion to minimize forces on the screened decanter; guiderails to define the vertical and horizontal movement of the invention; a lifting device to raise and lower the invention in the liquid at controlled descent speed and multiple rise rates; an effluent flow manifold with openings to allow liquid to flow to the screen from below the screen; a deflector plate with drain ports; an encoder to position the screen box in the tank to measure headloss and to insure the appropriate amount of screen is in contact with the wastewater; a protective maintenance hood to backwash, disinfect, and thaw the screen; controls, sensors, actuated valves, modulating valve, flow meter, and in some cases a filtrate pump if required by the existing hydraulic gradient.

Multiple units of the invention may be necessary to meet the needs of each application; similarly, multiple units of the invention may be used in the same tank to provide a redundant system as desired.

A SBX assembly defines a physical barrier providing a very low horizontal velocity to the wastewater exiting the clarifier so as to retain most of the supracolloidal and colloidal solids. The physical barrier has openings small enough to keep a majority of the supracolloidal solids within the primary clarifier. The deflector plate prevents the disturbance of the settled solids below the deflector plate and increases the travel time of liquid to discharge at the screen.

The fundamental difference between a prior art weir structure and a novel vertical screen structure in accordance with the present invention is that a weir structure permits only a relatively shallow layer of fluid from the top of the fluid mass in the tank to pass over the weir to exit the tank, thus creating comparatively high horizontal flow velocities which work against providing sufficient time for solids to settle below the level of the weir. A vertical screen structure, to the contrary, permits horizontal flow from the tank into the screen structure over a comparatively large surface area of screen and depth of flow, thus requiring only very low horizontal flow velocities to separate relatively large volumes of fluid from the tank fluids.

The vertical position of the SBX is controllably adjustable to provide a change in liquid elevation and a rest period with no forward velocities that allow the supracolloidal and colloidal solids in suspension to mix with the coagulant and settle, as there is no velocity towards the discharge. Such controls include a modulating screened effluent discharge valve, flow meter, and electronic control system that adjusts the screen surface area in contact with the liquid to maintain a screen loading rate (GPM/Sq. Ft. of Screen) based on discharge velocity, resulting in reduced screen fouling. Pressure transducers, encoders, and controls to measure headloss through the screen and to control the movement of the screened decanter are included in the system.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 27, 27a are elevational and plan views of a prior art wastewater treatment system, showing the footprint required by a retrofitted vertical lift SBX decanter system in accordance with the present invention;

FIG. 38 is a plan view of an LPSBX manifold; and

FIG. 39 is an isometric view of the LSBX manifold shown in FIG. 38, shown in inverted position.

DETAILED DESCRIPTION OF THE INVENTION

Figure 1:
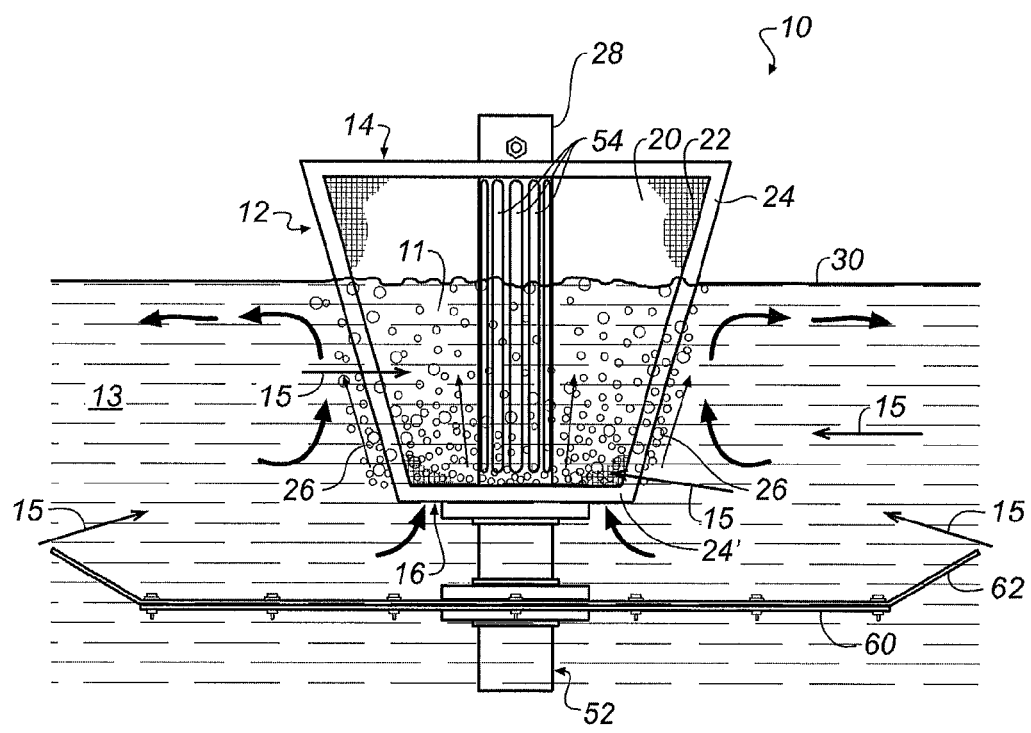
FIG. 1 is an elevational cross-sectional view of an SBX assembly in accordance with the present invention, showing the SBX screens being scoured by introduced air bubbles.
Figure 2:
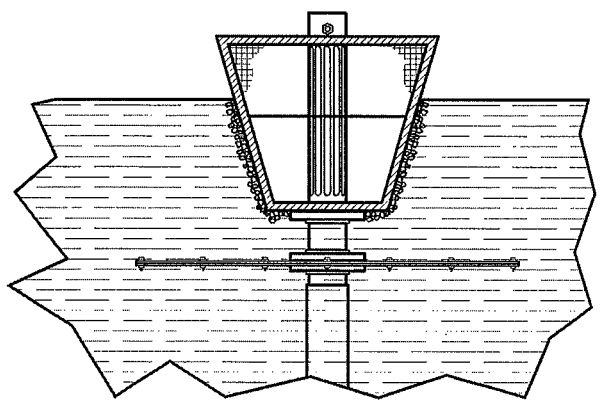
FIG. 2 is an elevational cross-sectional view like that shown in FIG. 1, showing the SBX screens being ⅔ clogged.
Figure 3:
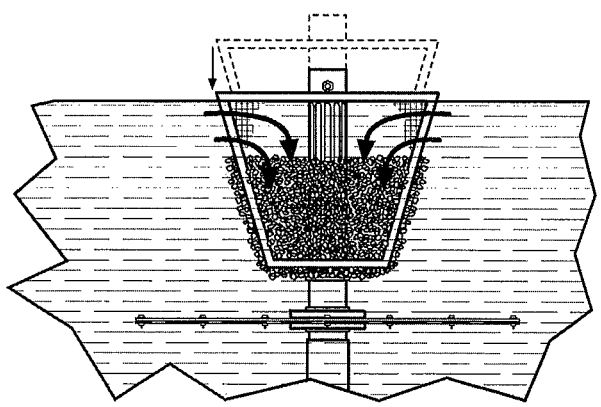
FIG. 3 is an elevational cross-sectional view like that shown in FIG. 2, showing the SBX screens being further immersed to permit continued operation of the unit with fresh screen surface.
Figure 4:
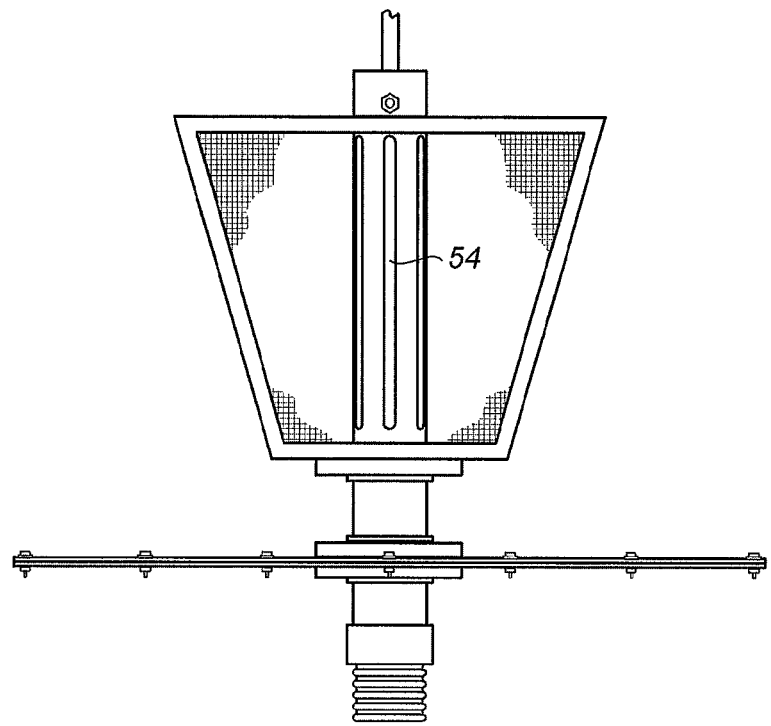
FIG. 4 is an elevational cross-sectional view like that shown in FIG. 1, showing the SBX being supported on a lifting column having slotted exit ports.
Figure 5:
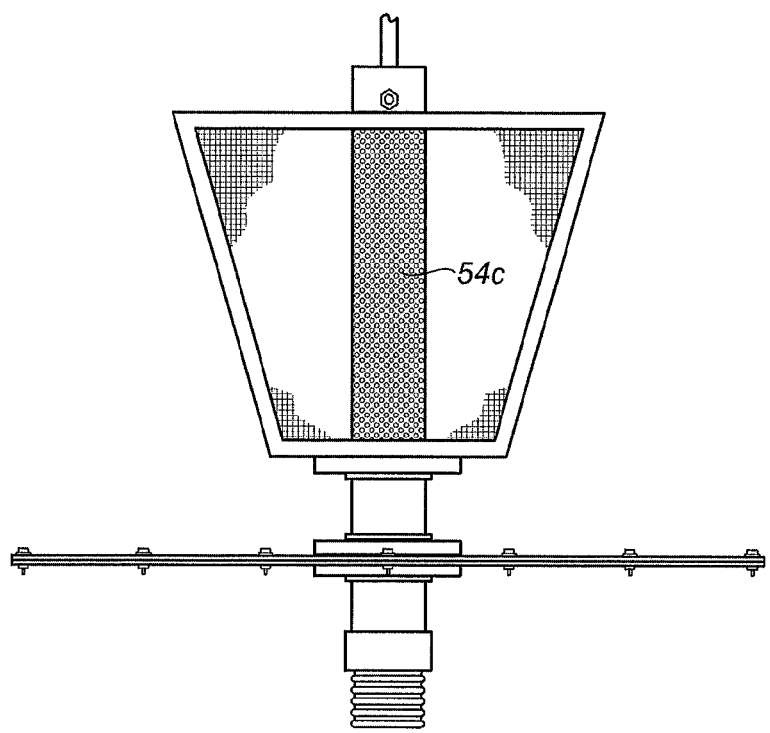
FIG. 5 is an elevational cross-sectional view like that shown in FIG. 4, showing the exit ports being screened.
Figure 10:
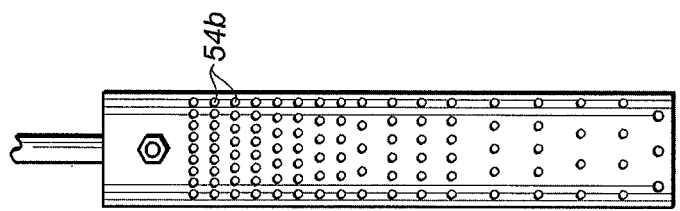
FIGS. 6 through 10 are elevational views of alternate configurations of exit ports in a lifting column.
Figure 9:
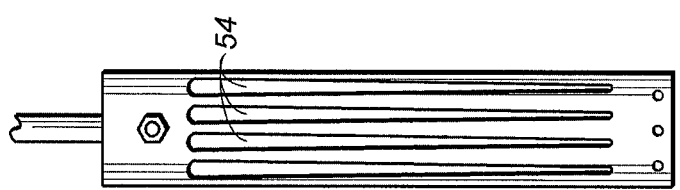
Figure 8:
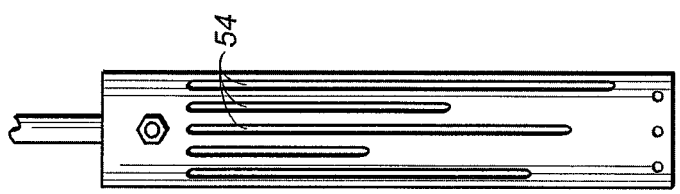
Figure 7:
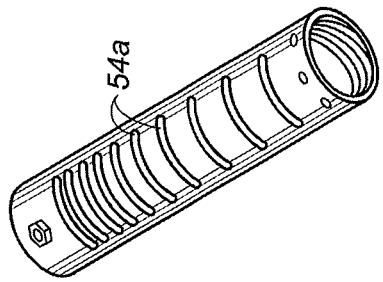
Figure 6:
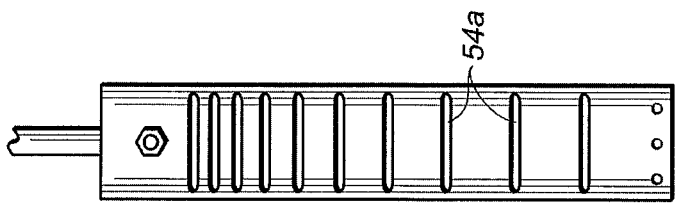
Figure 12:
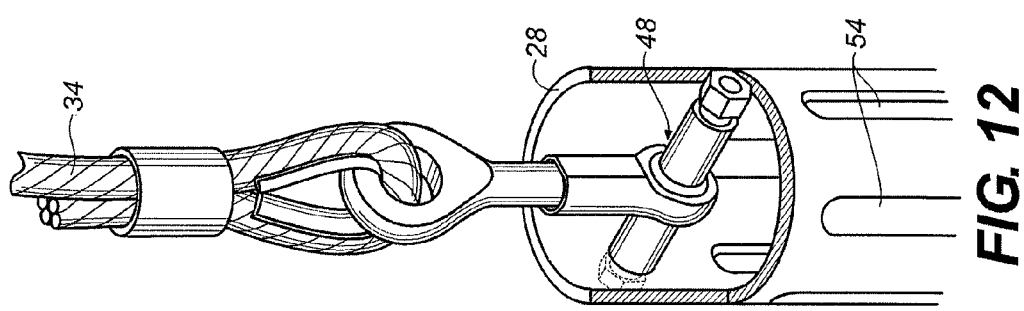
FIG. 12 is an enlarged view of the lifting cable attachment shown in FIG. 11.
Figure 11:
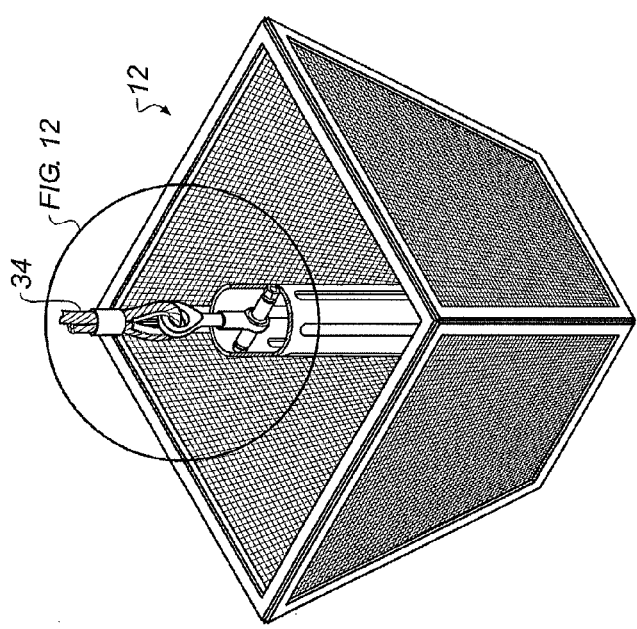
FIG. 11 is an isometric view from above of an SBX and central lifting column, showing a lifting cable attachment.
Figure 13:
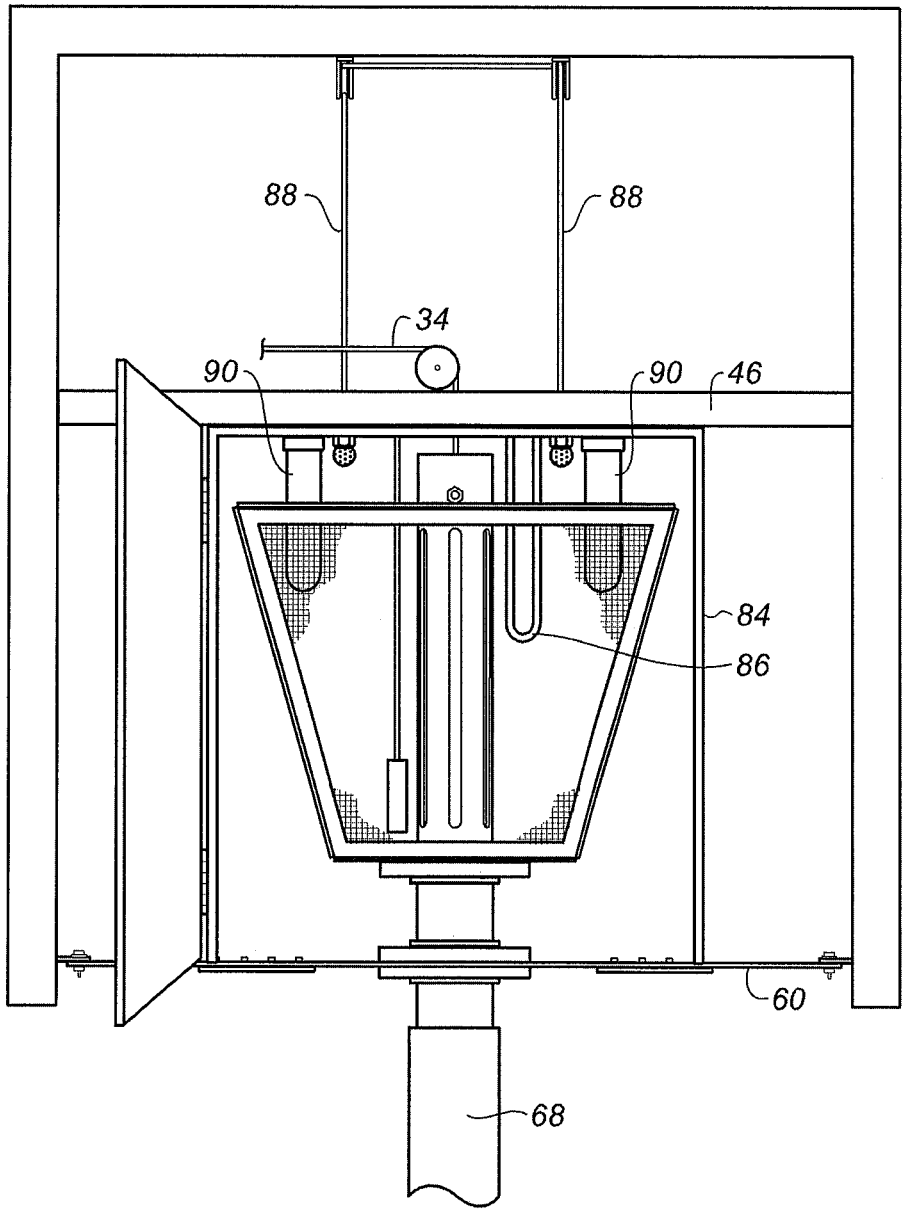
FIG. 13 is an elevational view of an SBX disposed for cleaning and disinfection in first embodiment of a hood in accordance with the present invention.
Figure 14:
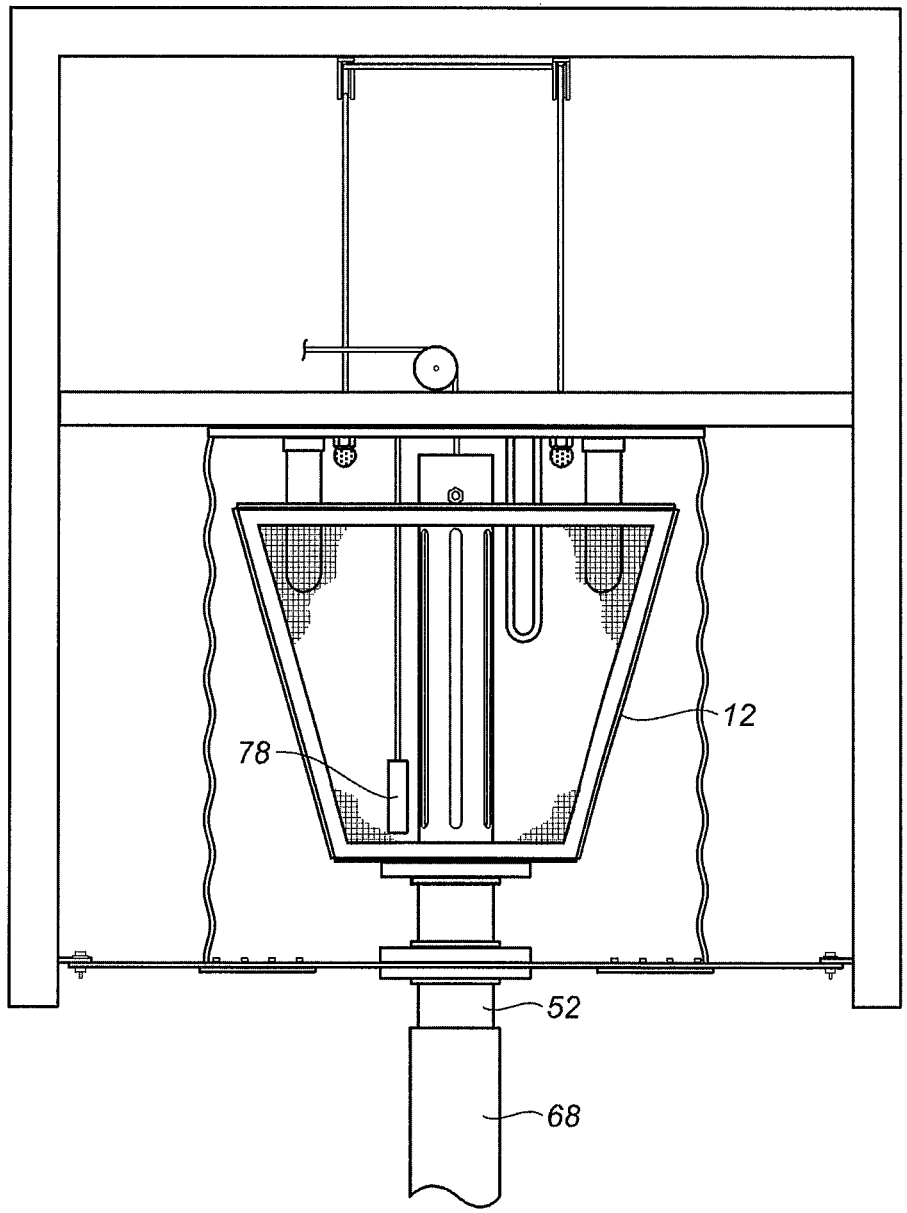
FIG. 14 is an elevational view of an SBX disposed for cleaning and disinfection in second embodiment of a hood in accordance with the present invention.
Figure 15:
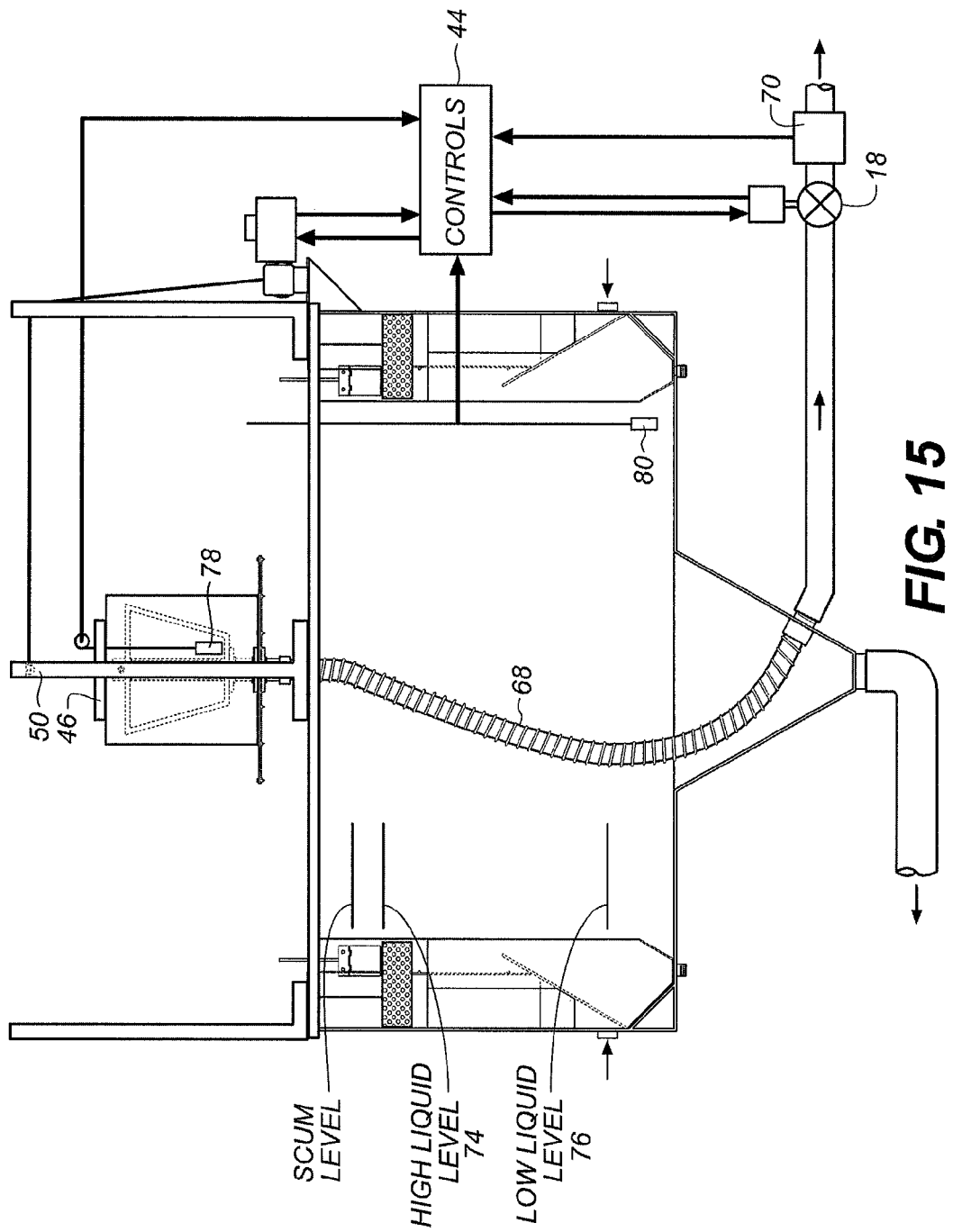
FIG. 15 is an elevational cross-sectional view of a complete wastewater treatment system, showing an SBX in raised position inside a cleaning hood.
Figure 16:
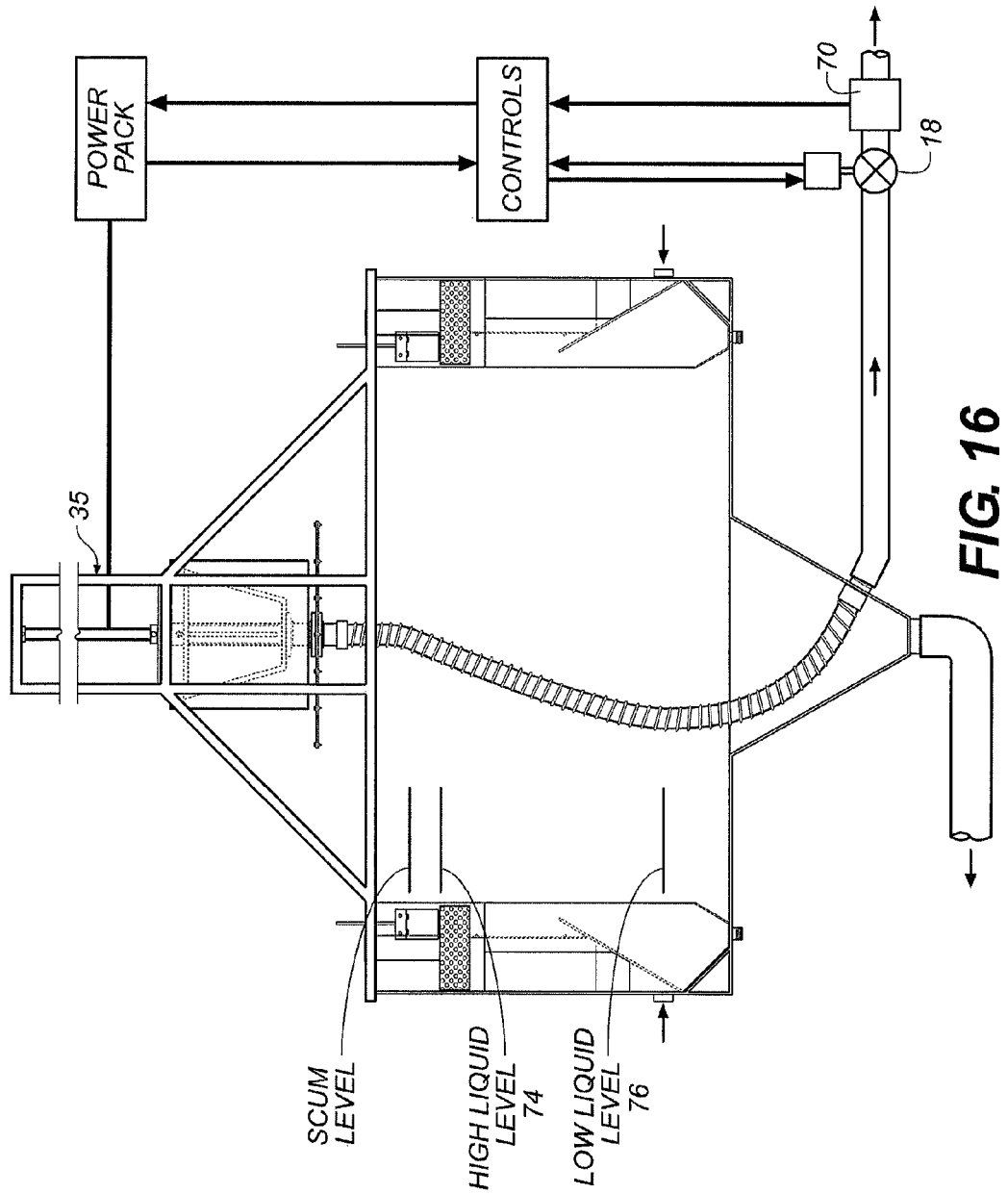
FIG. 16 is an elevational view of a water treatment system, showing a hydraulic or pneumatic power pack for lifting the SBX.

Referring to FIGS. 1-39, there is shown an SBX system 10 in accordance with the present invention, comprising the following elements:

Screen Box (SBX)

The top 14 of the SBX 12 (FIG. 1) is normally open to allow occasional screen washing via hose or automated spray system (spray ball for the symmetrical shapes or spray bar for the long rectangular boxes) and to access instruments located inside of the screen box.

Some applications (not shown) may require a closed and sealed top when the screen box operates completely submerged except for air vents. These air vents also serve to store screened liquid 11 to provide additional backwash volume.

The bottom 16 of screen box 12 is a solid plate with open areas to allow screened liquid 11 to exit the screen box and thus the tank. The solid plate 16 and closed effluent valve 18 (FIGS. 15-23) requires all screened liquid inside of screen box 12 to exit via the screened sidewalls to improve screen backwashing at the end of each decant cycle.

The sides 20 of screen box 12 consist of screen 22 and screen framing members 24 that may be vertical (perpendicular to the liquid surface) or sloped so that the top of the screen box is wider than the bottom creating a frustum shape. This allows for more screen surface to be in contact with the influent liquid 13, and liquid 13 enters from all sides thus decreasing the approach velocity 15 to the screen.

Some screen boxes may only have screened surfaces below the surface of the liquid with a solid vertical plate above the screen. The solid portion may be partially submerged to increase the volume of screened liquid inside of the screen box used for backwashing of the screen. This solid portion also will not foul due to fats, oils, and grease on the surface of the liquid.

Screens that are elongated and spaced closely to other screen boxes or racks may have a rounded or triangular end pieces to direct horizontal flow to between the racks with less turbulence in a more laminar flow.

Preferably, each screen rack is formed of fiberglass to avoid the corrosive decay to which metal racks and gaskets may be subject. Each screen is laminated to a flat sheet of FRP with an air scour header 24' laminated across the base of the screen. Preferably, header 24' contains low pressure air on the inside with small openings (not visible in FIG. 1) in the top of header 24' to provide air bubbles 26 to air scour to the screen surface. It is critical that screen box 12 be sealed along all edges to prevent the liquid 13 in the tank from entering screen box 12 by any means other than passing through screen elements 22. Gasketing may be provided as necessary, although non-gasketed arrangements are preferable.

Air 26 is released at the base of the screen surface through the tubular screen frame as described above. The vertical flow of air scours the external surface of the screen. Solids that may be pressed against the exterior surface of the screen by liquid moving through the screen are disturbed and carried upward. The vertical flow of air and solids also aligns elongated fibers vertically, or perpendicular to the openings in the screens, to reduce passage of solids through the screens.

Preferably, an oxidant solution (e.g., aqueous sodium hypochlorite or potassium permanganate) is injected into the compressed air line.

The ultrafine screen currently preferred is a SS wire woven as a fabric. Screens of different materials and opening sizes may be used in certain applications.

Multiple SBX modules 98 with individual synchronized lifting devices (FIG. 23) are likely for large flow installations and as redundant units. The features of each module include the previously described screen, screen attachment, air scour, hood, solid plate bottom, and may or may not include a closed top with air vents and other features described below.

Figure 24:
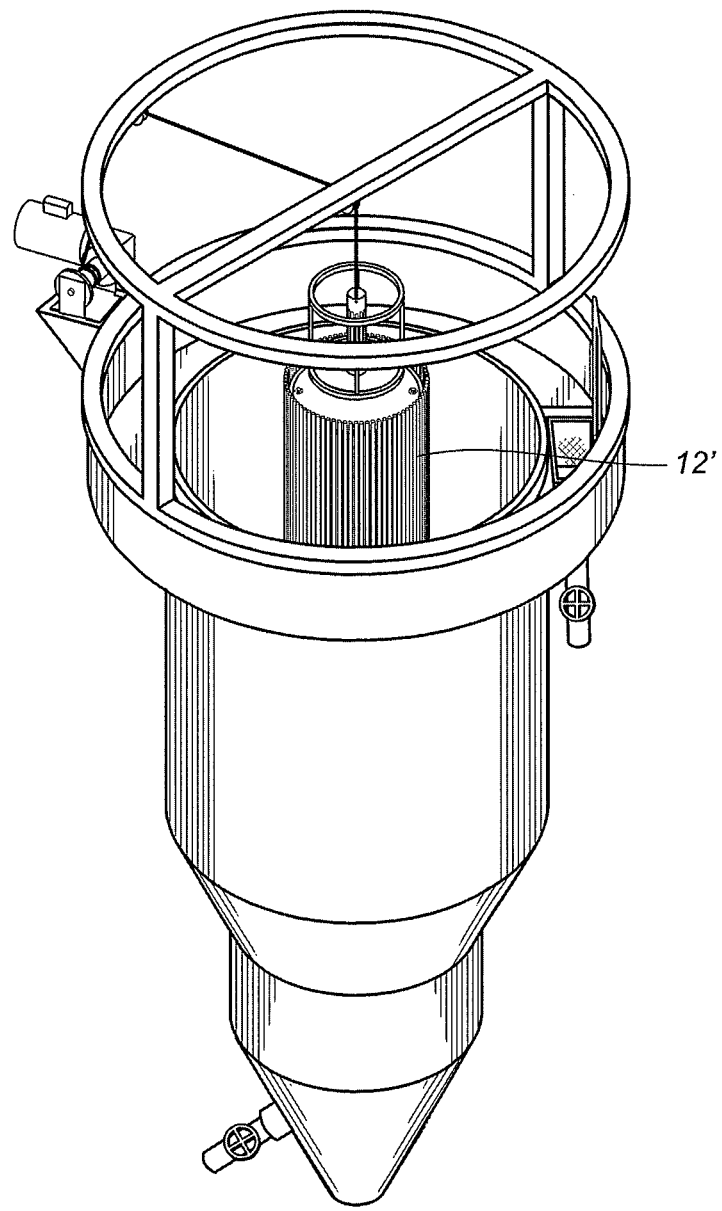
FIG. 24 is an isometric view from above, showing a single SBX in a single-tank wastewater treatment system having a circular tank and circular SBX.
Figure 25:
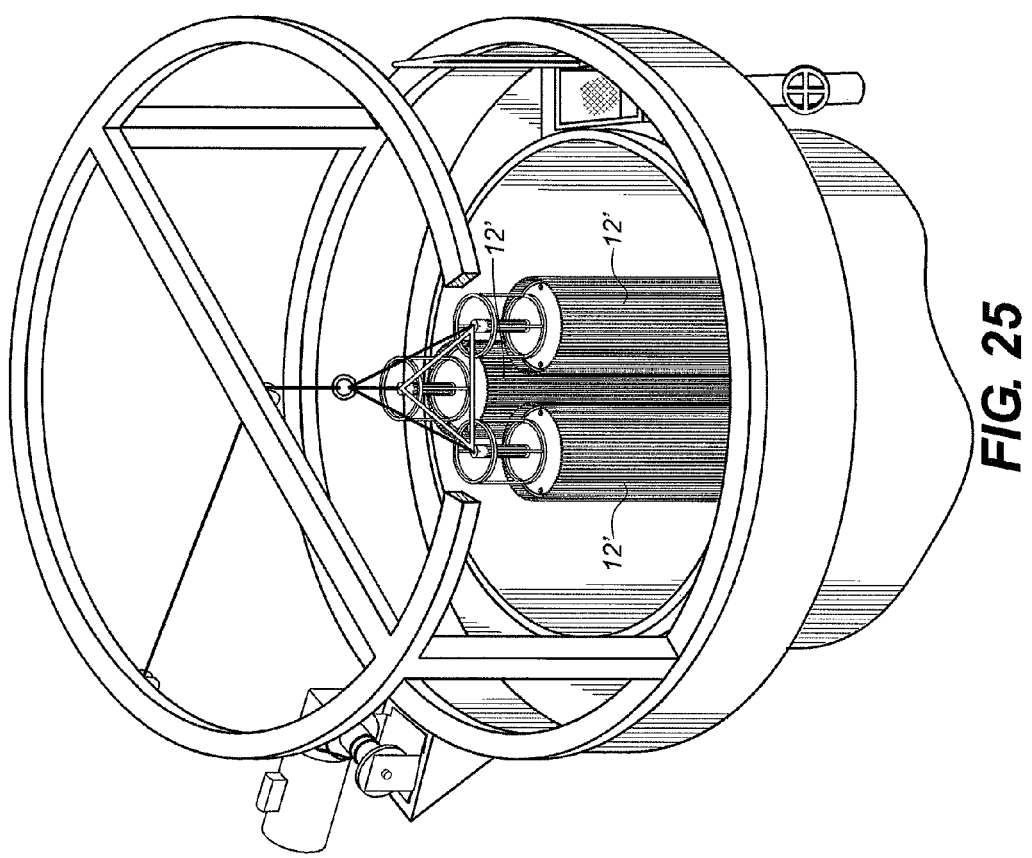
FIG. 25 is an isometric view from above of a larger circular wastewater treatment tank having a plurality of ganged cylindrical SBX units.

Referring to FIGS. 24 and 25, a second embodiment 12' of an SBX in accordance with the present invention may be cylindrical (circular) or conical (not shown). To provide added capacity, a plurality of SBXs may be ganged in parallel, as shown in FIG. 25. A cylindrical SBX is especially useful in an installation having a cylindrical tank. The structure and operation of a cylindrical SBX is similar to that of a polyhedral SBX 12.

Comparison of Prior Art Clarifier Weir with a Screen Box Decanter

Preferably, the present screen box system incorporates coagulation and an ultrafine screen.

For a conventional primary clarifier weir, the horizontal velocity of fluid at the weir may be calculated as follows:

20,000 gallons per day/foot of weir=0.0309 cubic feet per second/foot of weir.

If the liquid depth over the weir is 3 inches, the horizontal fluid velocity at the weir=0.124 FPS.

To the contrary, an SBX in accordance with the present invention can provide a horizontal fluid velocity of <0.009 FPS. Combining the use of a coagulant, ultrafine screen, and effluent velocity approximately 13 times lower than the conventional primary clarifier can produce a BOD removal of 65% to 85+%.

In addition to the previously stated benefits related to organic (BOD) reduction, secondary wastewater treatment processes can see additional benefits from the invention in:

Improved oxygen transfer efficiency to further reduce energy consumption.

Removal of fibers that cause fouling of hollow fiber and flat plate membranes so reduced air scour energy, increase the membrane life, and reduce operational issues requiring Clean-In-Place (CIP) activities.

Figure 18:
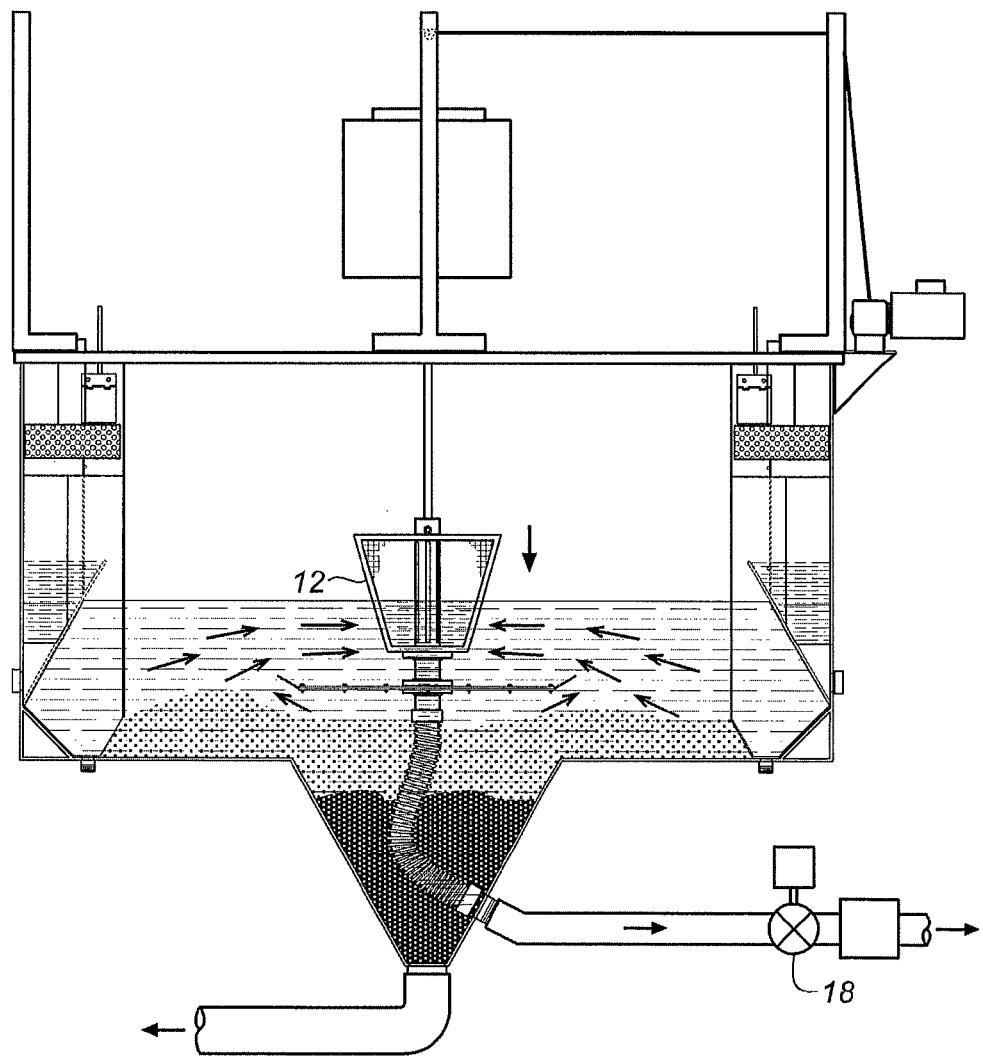
FIG. 18 is an elevational cross-sectional view like that shown in FIG. 17, showing an SBX having been controllably lowered in accordance with the present invention to follow a drop in tank level to maintain a desired immersion level of the SBX.
Figure 19:
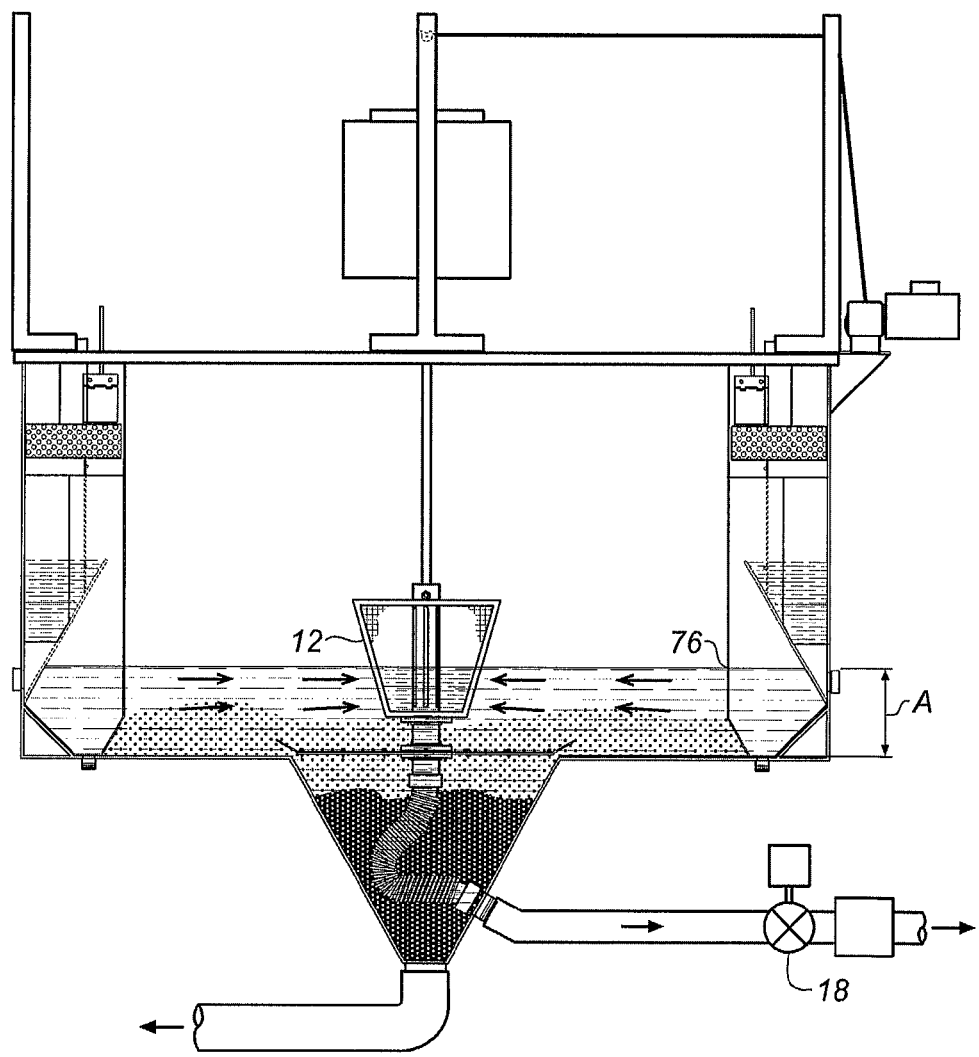
FIG. 19 is an elevational cross-sectional view like that shown in FIG. 18, showing an SBX having been controllably lowered still farther to follow a further drop in tank influent level to maintain a desired immersion level of the SBX.

Without chemical addition, an SBX system in accordance with the present invention can remove approximately 55% of the BOD. The ultrafine screen has openings smaller than the supracolloidal particles; the air scour causes an upward velocity greater than the forward velocity of the exiting liquid causing fibers to align vertically or perpendicular to the screen openings; the reduced velocities at the screen improve settling; the deflector plate increases the travel distance of the settled BOD laden solids under the screened decanter (as shown in FIG. 18) and stops the vertical velocities of the rising air bubbles from disturbing and carrying the settled BOD up towards the screen.

Figures 26, 26A:
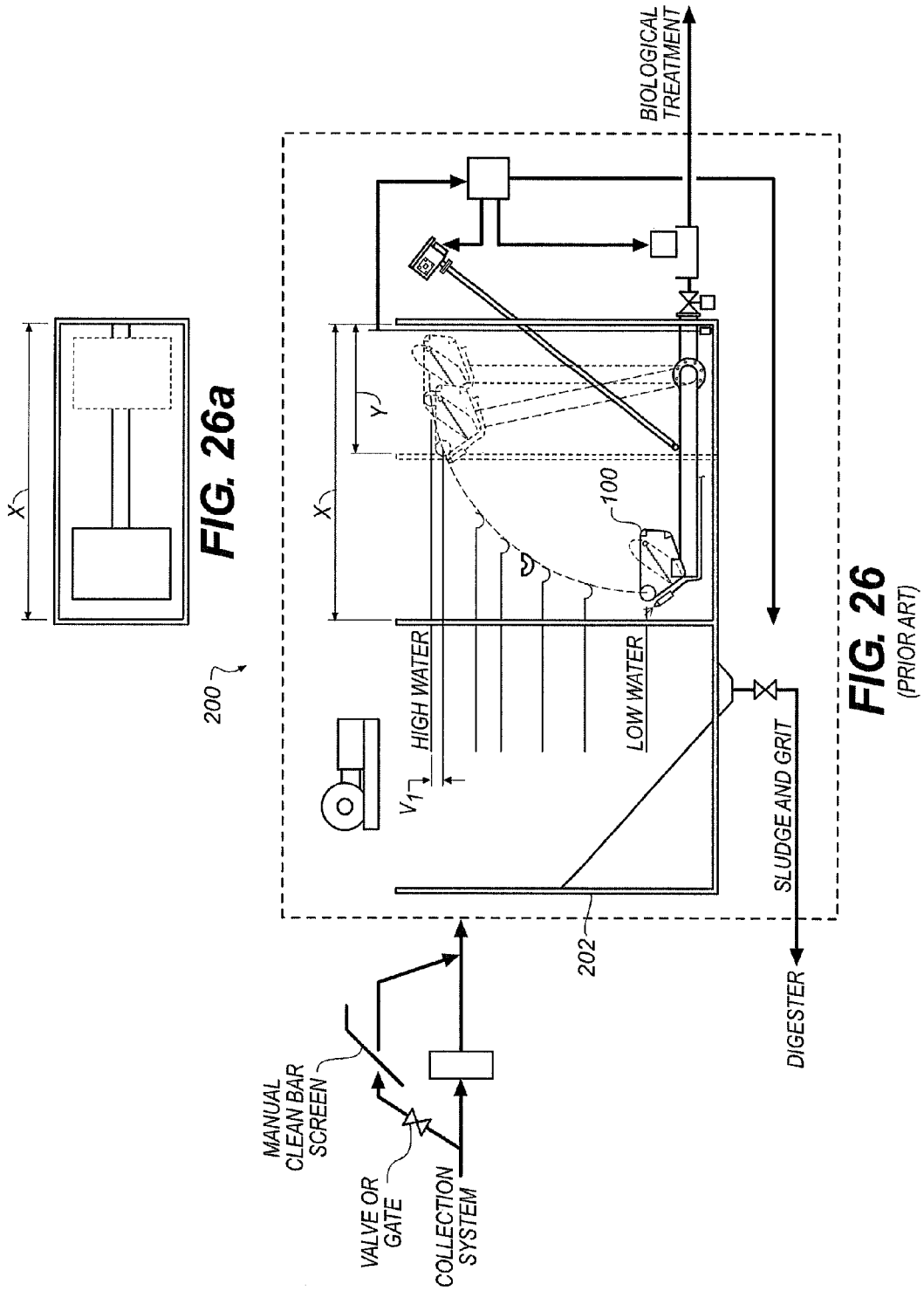
FIGS. 26, 26a are elevational and plan views of a prior art wastewater treatment system, showing the footprint required by a prior art pivoting decanter.
Figure 28:
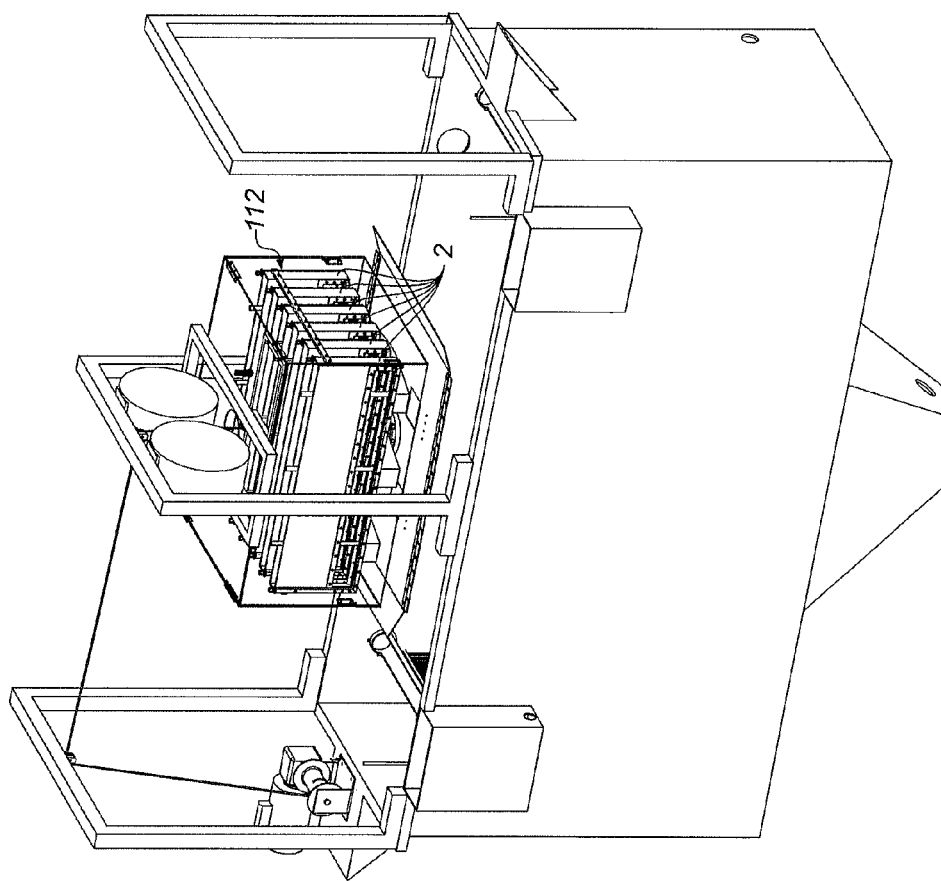
FIG. 28 is an isometric view showing multiple racks mounted to a single discharge manifold with retractable air hose reels above in a single tank.

Screen box 12 replaces the effluent weir 100 used in all prior art clarifiers, (see, e.g., FIG. 26). The benefits of the screen box over the conventional effluent weir or launder are:

| Conventional Effluent Weir Or Launder | Screen Box | Benefit |
| --- | --- | --- |
| Stationary Effluent Weir | Moves Vertically | A vertically moving weir changes dynamics of clarification by allowing the liquid level in the tank to change as a stationary effluent weir maintains a minimum liquid level in the clarifier/tank equal to the elevation of the weir. Water enters the clarifier and the liquid near the weir immediately exits at the same rate as water does not compress and the tank does not expand to store this additional water. The invention decants the liquid in the clarifier to a low level then rises out of the tank. Water enters the clarifier having a low level and fills to a higher level. During this filling process there is no means for the contained water to exit the clarifier as the (SBX) is out of the tank. Therefore there is no directional flow or inertia or energy instilled into neutrally buoyant solids and there is no scouring or suspension of settled solids near the bottom of the clarifier that would occur if the water were continually moving towards an effluent weir. |
| Weir that rotates about a pivot | Weir that Moves vertically | Vertical movement has no horizontal dimension. Movement about a pivot has both horizontal and vertical dimensions. The horizontal motion must be considered in the design of a new clarifier or the retrofit of an existing clarifier. In all cases the horizontal space is larger for a pivoting than a vertical moving weir. A fixed weir that rotates about a pivot is limited to the width of the tank and receives flow in one direction, towards the weir. If a second weir is added to the same pivoting decant arm in an attempt to reduce the liquid velocity at the weir, the weir with the shortest radius will always be lower in elevation than the weir traveling along a longer radius. The weir and decanting arm uses gravity flow so the potential range of motion is limited to 9:00 to 12:00 or 12:00 to 3:00 (At 12:00 the decanter is out of the water and at 3:00 there is no hydraulic gradient so there is no flow at the ends of this range). The liquid will travel to and over the weir with the lowest elevation in the water at a disproportionate rate creating uneven flow patterns through the screen causing regionalized fouling issues. A vertically moving screen (no pivot) can have more than one weir or one continuous weir that remains at the same elevation throughout the full vertical range of motion. The weir is screened so an increased amount of screen is receiving equal flow thus reducing the velocity at the water/screen interface. |
| Physical Weir | No physical weir | The liquid must flow over a physical edge and free fall. The free fall of water creates a slight pulling action and no frictional headloss. Both of these create a high weir entrance velocity. As an example, a 3' long weir with 1' depth of water over the weir has a discharge flow rate of 35.4 GPM or 0.079 CFS/0.083 SF = 0.95 FPS @ weir. There is no weir in the screen box with the liquid level set by the effluent flow and selected screen loading rate (GPM/Sq. Ft. of screen). Using a screen loading rate of 4 GPM/SF and the same flow rate of 35.4 GPM the required screen surface area is 35.4 GPM/4 GPM SF = 8.85 SF of screen, The screen box is positioned based on screen configuration to a depth placing 8.85 SF of screen in contact with the liquid. The velocity of the liquid at the screen is 4 GPM/448.8 = 0.009 FPS. 0.95 FPS/0.009 FPS = 106.6 times lower velocity at the screen surface than at the weir. |

| Conventional Effluent Weir Or Launder | Screen Box | Benefit |
|---|---|---|
| | | The low 0.009 FPS horizontal (created by the deflector plate) exit velocity through the screen, positioned near the liquid surface far from the settled solids, results in less scouring and disturbance of the settled solids and organic matter. |
| | | No physical weir allows a greater liquid depth and 360° horizontal flow of liquid moving towards the exit, thus significantly larger cross-sectional area of liquid at every flow radius. The larger the cross-sectional area the slower the velocity for the same volume of liquid exiting the system. |
| No Deflector Plate | Deflector Plate | Previously described, but in summary it creates a horizontal flow pattern versus a 180° flow pattern towards a fix effluent weir. |
| | | Existing effluent weirs do not have horizontal deflector plates or baffles as all flow must exit at the liquid surface. There is a Stamford Baffle that was developed to deflect the solids away from the effluent weirs as the liquid rose from the sludge blanket level towards the fixed effluent weir. |
| | | The Stamford baffle is a 45° plate to allow a vertical flow vector. The invention's flat deflector plate discourages all vertical flow patterns because the SBX lowers with the liquid at the same rate to maintain a fixed screen surface area thus not requiring any vertical flow to exit. |
| Weir is located at opposite end of inlet | Screen Box is positioned nearer the center of the tank | Water exiting near the center of the tank reduces short circuit caused by placing a stationary weir near a side wall. The wall reduces the cross-sectional area of the water moving towards the exit causing higher velocities. |

Deflector Plate

A deflector plate 60 is placed below air scour 24' to stop disturbance of settled solids that may be caused by vertical currents created by rising air bubbles from the air scour. Deflector plate 60 also increases the horizontal travel distance to the screen surface for any supracolloidal or colloidal solids that may be disturbed and start to move towards the tank discharge/screen.

The deflector plate is sized to extend several feet (some distance) past the edge of the screen box 12. The actual size and shape of the deflector is dependent on the size and shape of the screen box and tank. The deflector plate edge nearest the tank wall may have a flexible sealing strip 62 mounted to the deflector plate if the distance to the wall and edge of the deflector plate is within 3 feet or the tank configuration requires such to stop transient rising currents. Sealing strip 62 connection to deflector plate 60 preferably is via slotted holes to allow the strip to be adjusted closer to or farther away from the wall and then tightened into final position. Sealing strip 62 should be within 1/16 inch or actually touching the tank sidewall to minimize vertical flow from below.

Deflector plate 60 preferably has drain ports 64 that open with low pressure to allow liquid above the deflector plate to pass through the plate when the screen box is moving upward. The drain ports may be low tension flap valves, molded polycarbonates with resilient properties, or the like.

Deflector plate 60 may be made of a flexible material that bends downward to allow liquid above the plate to flow easily off the edges. Such type of plate would obviate the need for the drain ports.

Preferably, the edges of deflector plate 60 facing the influent feed troughs 66 are raised at an angle to increase the travel distance and deflect supracolloidal and colloidal solids rising from below the deflector plate towards the influent feed troughs and away from the screen box as the screen box lowers in the liquid.

Screen Box Lifting Apparatus

A screen box lifting apparatus 28 may be pneumatic, hydraulic, winch and cable, or other mechanical apparatus to raise and lower the SBX 12 in a path perpendicular to the surface 30 the liquid 13. The vertical (up/down) movement of the SBX allows the SBX system to be installed in relatively small clarifier tanks of circular or square geometry.

The currently preferred lifting apparatus 28 comprises a combined winch 32, cable 34, a pulley or pulleys 36, and a winch drive 40. The winch and cable provide an unlimited range of vertical motion, whereas the range of pneumatic, hydraulic, and mechanical actuators are limited (at this time) to about 8 feet due to lateral stresses created by the liquid movement. As development of pneumatic and hydraulic actuators proceeds, their incorporation in SBX systems may increase. An overhead pulley arrangement keeps the SBX assembly centered in the tank.

The lifting range of motion typically is from the bottom of the tank (likely low level is 1-5 feet) to 6 feet above the top of the tank.

Preferably, winch drive 40 is a vector motor, which can operate at 0-RPMs without overheating. A vector motor is desirable to ensure that the SBX descends at the same rate as the change in liquid level, which is critical to not disturbing the supracolloidal and colloidal constituents in the waste water, to promoting horizontal versus vertical currents towards the screen box, and to maintaining the liquid/screen contact area to control the screen solids loading rate.

Figure 20:
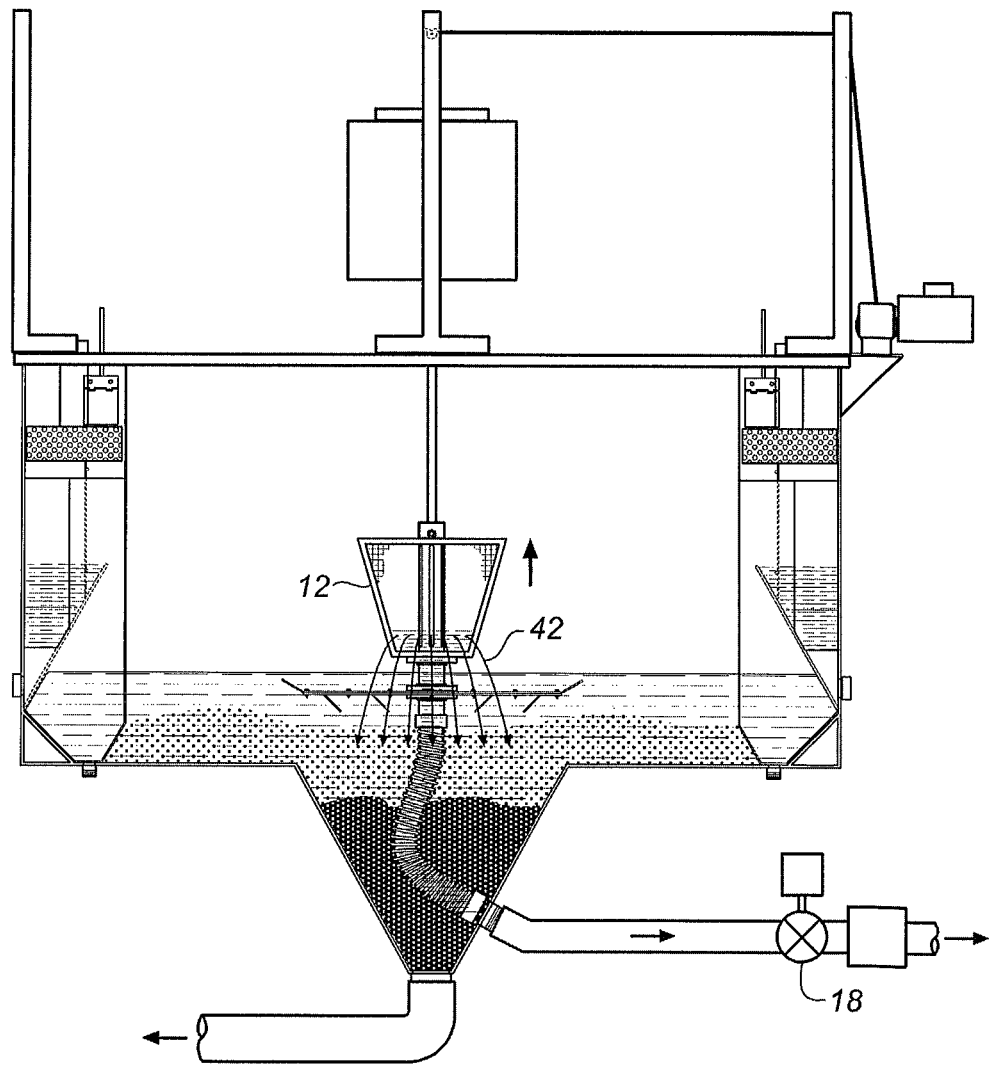
FIG. 20 is an elevational cross-sectional view like that shown in FIG. 19, showing an SBX having been controllably raised from immersion to permit backwash of the screens in the SBX.
Figure 21:
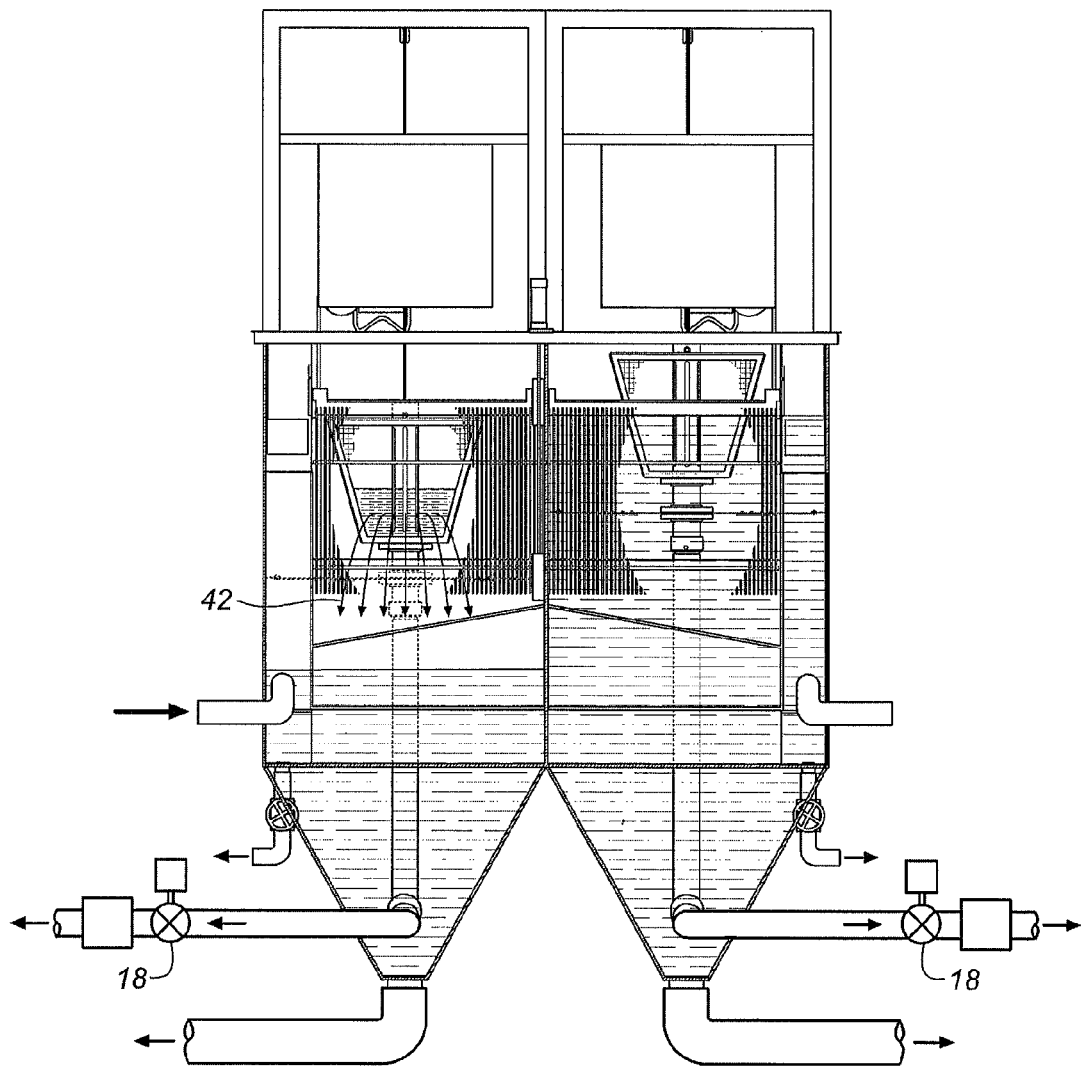
FIG. 21 is an elevational cross-sectional view of a dual-tank wastewater treatment system, showing the SBX in one tank being backwashed while the SBX in the other tank continues in normal service.
Figure 22:
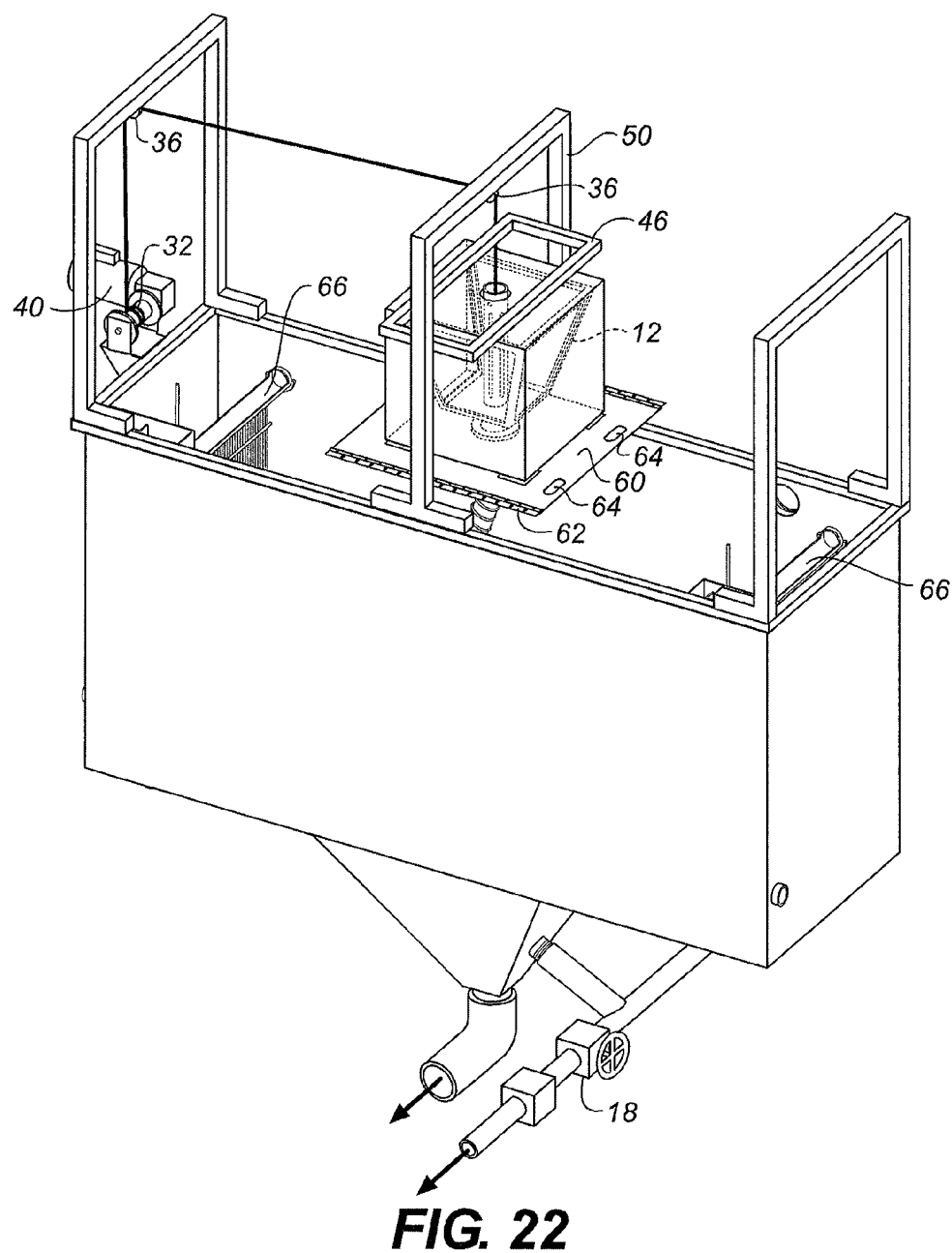
FIG. 22 is an isometric view from above, showing an SBX single-tank wastewater treatment system similar to that shown in FIG. 15.
Figure 23:
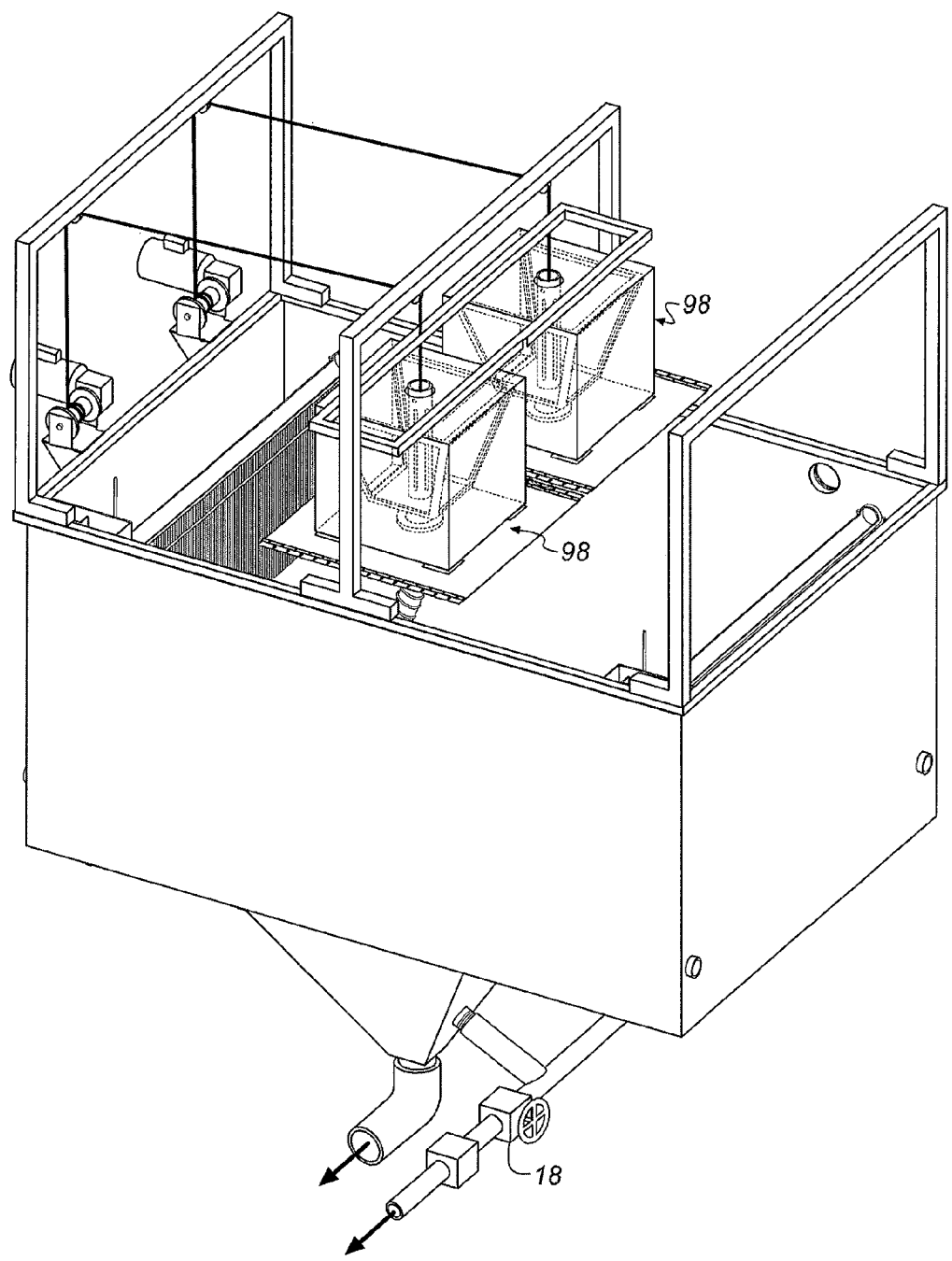
FIG. 23 is an isometric view from above, showing multiple SBXs in a single tank wastewater treatment system.

As shown in FIGS. 20-21, at the conclusion of a decant cycle, raising of SBX 12 starts slowly to reduce an energy spike/demand to conserve energy and then quickly accelerates to increase the exit velocity of the filtrate from inside SBX 12, in the reverse direction through the screen, creating a vigorous backwash 42 of the screen. This action is initiated and controlled by control system 44.

Cable 34 is connected to a baffled lifting column 28 for small units and to a support frame 46 of larger units. A ball and socket device 48 allows screen box 12 to move laterally as needed to reduce stress on the lifting device and to provide additional scouring of the screen box via slight horizontal motion caused by air scour and discharge hose rigidity.

Vertical guiderails are provided on the tank to guide SBX 12 in its vertical path. Guiderails interface with support frame 46 to align the SBX with the hood. The guiderails may be placed in various positions relative to the SBX depending on the configuration of the tank.

An encoder (not shown) tracks the vertical position of screen box 12 in the tank. Knowing the position of the screen box in the liquid is critical to knowing headloss through the screen and thus to having the correct amount of screen surface area in contact with the liquid for a specific screen loading rate and effluent flow rate. An algorithm to the SCADA provides control feedback on current RPM to slow or increase the motor to the proper speed.

Baffled Lifting Column and Stub Effluent Pipe for the SBX

Baffled Lifting Column 28 is a slotted or perforated circular pipe that is internally or externally threaded at the base to connect to the SBX Stub Effluent Pipe 52. Lifting column(s) 28 (the long rectangular screen racks have (3) lifting columns and not all are used for lifting and all are centered and equally spaced in the screen racks) is centered in the SBX with openings 54 to encourage flow distribution through the screen. In rectangular or square frustum SBX shapes preferably there is more open area on the Baffled Lifting Column facing the box corners so as to pull more liquid from the corner or more distant screen. The open area closest to the screen will have the lowest surface area. If the screen is an equal distance from the Baffled Lifting Column, as in a cylindrical SBX, then the open area is the same around the circumference of the circular lifting column.

Preferably, the open area of the Baffled Lifting Column is lowest at the bottom and increases with elevation, creating headloss at the lower portion of the lifting column to equalize travel distance and pressure, and thus to equalize flow through the screen from the lowest point to the highest point of liquid contact.

Various configurations of suitable openings (vertical slots 54 tapering or of variable length, horizontal slots 54a, holes 54b, and screening 54c) are shown in FIGS. 4-10.

Baffled Lifting Column 28 connects to SBX Stub Effluent Pipe 52 that connects directly to a flexible discharge hose 68 that directs the filtrate/effluent to effluent exit valve 18.

Liquid Level and Effluent Flow Controls

Referring to FIGS. 15 and 17-20, for gravity discharge flow applications, the flow rate of screened wastewater exiting the tank is controlled by a modulating exit valve 18 that opens or closes incrementally to maintain a target flow rate set by the controls 44 and measured by a flow meter 70 located upstream or downstream of the modulating exit valve.

The elevation of the discharge end of the screened wastewater pipe 72 is fixed as are the diameter and length of pipe connecting the SBX, SBX Stub Effluent Pipe, Discharge Hose, Flow Meter, and Modulating Valve to the discharge end. The piping and discharge location and elevation are a component on the infrastructure and not subject to change.

The change in liquid elevation within screen box 12 and the change in elevation of the screen box in the tank from a high liquid level 74 to a low liquid level 76 affects the hydraulic pressure in the screened effluent piping. The greater the elevation difference between inlet liquid elevation and discharge liquid elevation, the greater the pressure difference and thus flow. The lower the difference, the lower the pressure and thus flow.

Figure 17:
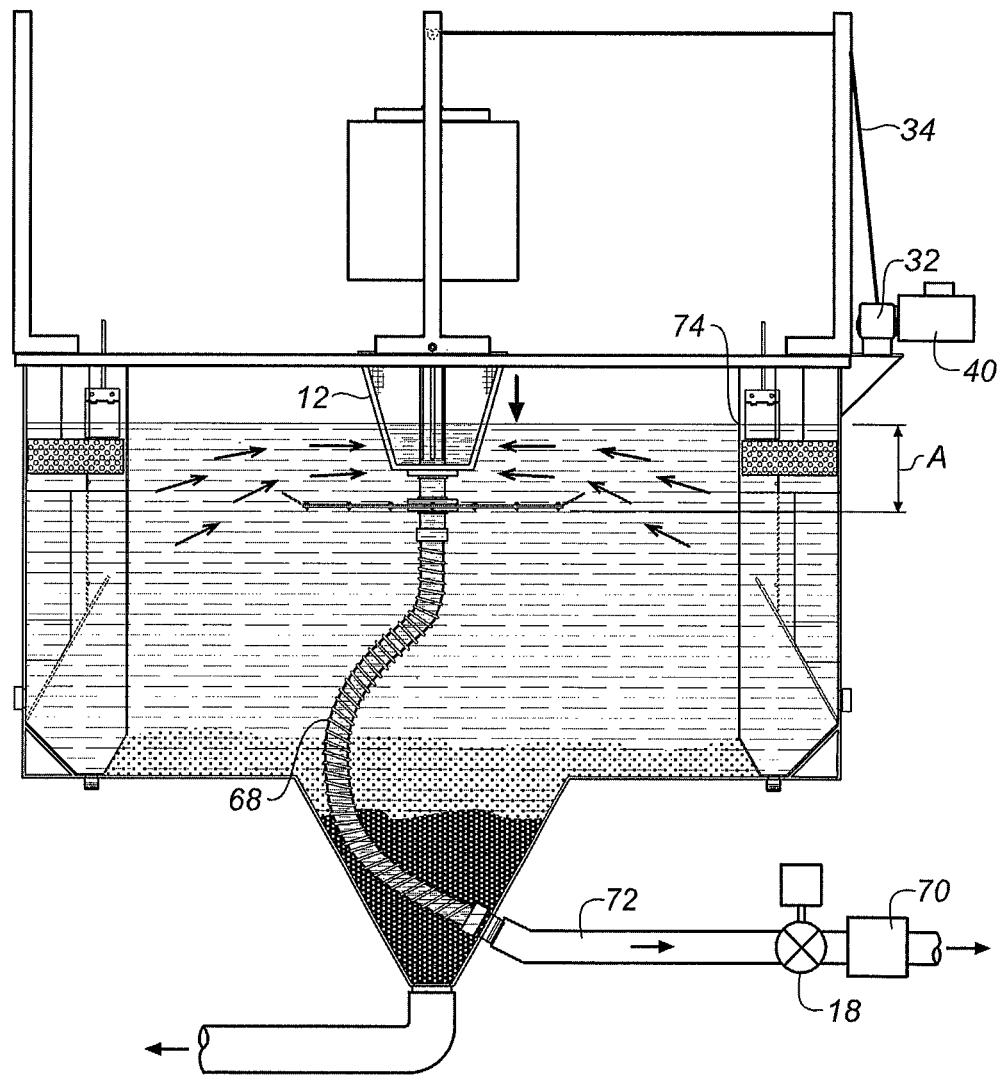
FIG. 17 is an elevational cross-sectional view like that shown in FIG. 15, showing an SBX in lowered position, freshly cleaned and entering into service.

Screen box 12 starts a decant cycle at the high liquid level 74 in the tank (FIG. 17). Screen box 12 lowers at the same rate as the liquid level in the tank. When the tank liquid level reaches the low level set point, the screen box then is lifted upwards. The captured screened liquid exits outwards through the screen on the screen box. The faster the rise rate, the higher the exit velocity of the screened liquid moving through the screen. The high velocity creates a more vigorous backwash resulting in a more thorough cleaning of the screen.

The system employs a pair of pressure transducers 78,80 (FIG. 15) disposed within the screen box and the tank, respectively. The control system 44 uses input from the flow meter 70, pressure transducers 78,80, and tank encoder to automatically position the screen box in the liquid to provide the defined screen surface area in contact with the liquid. The controls can automatically adjust the screen/liquid contact area to any desired value when the differential volume of the tank exceeds standard allowable deviations as in an abnormal flow condition that activates an alarm followed by adjustments in the target flow and decant cycles.

The flow rate of screened wastewater exiting the tank can also be controlled by a pump (not shown) instead of a modulating valve 18. A pump may be used when there is inadequate active volume (volume between high and low liquid level—depth of decant) or the discharge elevation and the liquid level in the screen box is not adequate to flow by gravity at the required rate. A variable frequency drive (VFD) provides the incremental discharge flow control.

Discharge Hose

As described above, flexible discharge hose 68 is connected to pipe 52 near the bottom of the tank for gravity discharge (the more normal situation) and higher in the tank if the filtrate is pumped. The hose connection to the SBX 12 is to the internal flow distribution, lifting column 28 and SBX stub pipe 52 of a smaller single SBX unit or to the filtrate manifold 82 if multiple SBXs are used to provide more screen surface area. Hose 68 may have swivel connections to allow the hose to twist as the screen box moves up and down in the tank or the hose may be an accordion type of hose/duct to increase in length as the screen box rises up to above the tank to the hood or contracts as the screen box decants to the low liquid level in the tank. It is currently preferred to use an accordion type hose as it provides less disturbance of the settled sludge.

Screen Box Hood

An enclosing hood 84 that may contain a heater 86, screen spray system 88, and/or UV disinfection apparatus 90 is placed above the tank over each screen box 12. Lifting cable 34 passes through an opening in the center of the hood. The hood 84 is mounted to the pulley support or other structure above the tank. The hood has an open bottom and hinged or flexible sides to allow access to the screen box, heater, screen spray system, UV disinfection, control instrumentation, etc. If UV is used, then a flexible protective seal (not shown) and sidewalls (not shown) and interlocking controls to deactivate the UV prior to lowering the SBX are provided to avoid accidental exposure.

In addition, in operation, hood 84 blocks the sun from the screen, preventing the growth of algae that could foul the screen.

Instruments and Controls Specific to Screen Box Functions

As described above, a pressure transducer (PT) 80 in the tank provides the controls with the liquid depth in the tank. A PT 78 in the screen box provides the liquid depth in the box. An encoder provides the position of the screen box in the tank.

These 3-inputs provide basic information necessary to perform the following functions:

1. Screen Surface Area Adjustment

The screen surface area for each incremental elevation of screen is entered into the control system, as the screen sizes may vary. The operator sets a) a screen loading rate in GPM/SF, b) the desired Target Flow (TF) or discharge flow. These two variables then dictate the depth of the screen in the liquid to provide the correct screen surface area. The controls adjust the screen depth and thus surface area in the liquid to match the operator entered screen loading rate and effluent flow.

2. Lowering of the Screen Box at the Start of a Decant Cycle

The air scour starts when the lower level of the screen reaches the liquid level. This is done to keep the liquid from flowing into the screen box without the air scour, to reduce fouling. Air scour could be activated at the start of decent but it consumes energy for no process benefit.

3. Lifting and Flushing of the Screen Box at the End of a Decant Cycle

The lifting of the screen box was partially described above.

When the low liquid level is reached and it is time to raise the screen box out of the liquid, the effluent valve on the filtrate discharge piping is closed to prevent the screened wastewater/filtrate in the screen box from exiting via the discharge hose when the screen box is lifted. The screened wastewater reverses flow and exits through the screen, thus flushing the solids on the outside surface of the screen away from the screen surface.

With the effluent valve still closed, the screen box is lowered a set distance into the liquid in the tank to increase the volume of filtered liquid in the screen box. The entrance velocity of the liquid entering the screen box to fill the additional volume of filtered wastewater is low due to the slow descent and no discharge. This is done to prevent the solids laden lower liquid from fouling the screen. By refilling the screen box, the volume of backwash effluent is increased.

With the desired volume of filtered wastewater inside of the screen box, the screen is raised slowly at first for a short period of time and then quickly accelerates to increase the backwash flow velocity. As the screen box reaches a certain elevation, the vertical motion of the screen box slows and continues to slow as it reaches the hood and then stops at a set elevation or contact switch or other position detection device.

4. Activation of Screen Spray System, Heater, UV Disinfection

The controls allow the operator to set the frequency of screen spray and UV disinfection cycles as needed based on a count of decant cycles. The systems will be activated when the screen is properly positioned and a contact switch in the hood is activated. The duration of the backwash in the hood is set by the amount of screen surface area and the available flow and pressure of the site.

The screen spray system will be automatically activated on the next cycle if the screen headloss reaches a user-defined set point.

The heater is temperature-controlled and deactivated to conserve energy when the screen box is not in the hood.

Low Profile Screen Box

Referring now to FIGS. 28-37, a Low Profile Screen Box (LPSBX) 112 can be useful for applications of high flows, limited surface area to place a screen box, and/or shallow active volumes (the vertical distance between high and low water levels) of existing primary clarifiers. The low profile minimizes the height the SBX occupies from the bottom of the deflector plate to the top of the screen surface area.

Multiple screen boxes 112 or racks are ganged in parallel to provide the necessary screen surface area at a controlled screen loading rate.

Figure 31:
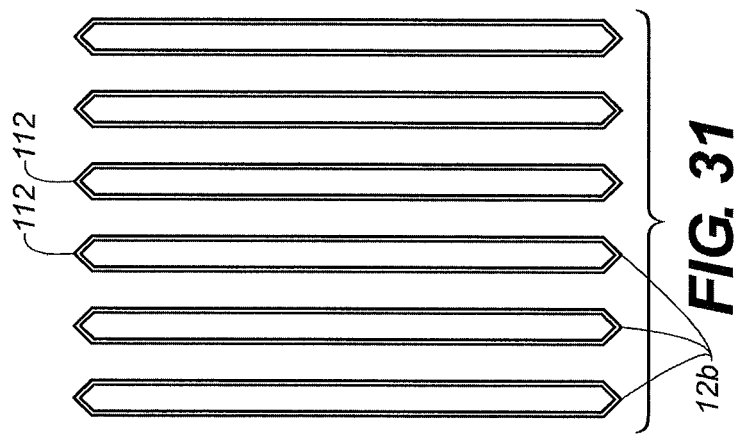
FIG. 31 is a plan view of multiple screen racks with triangular ends to improve horizontal flow patterns.
Figure 30:
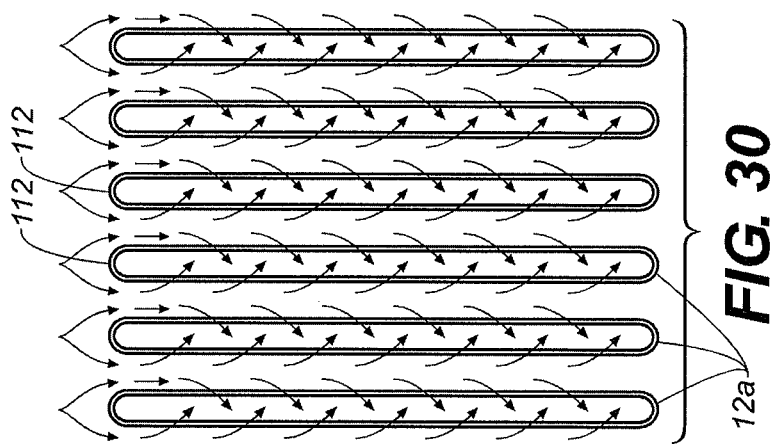
FIG. 30 is a plan view of multiple screen racks with rounded ends to create a volute shape to improve horizontal flow.
Figure 29:
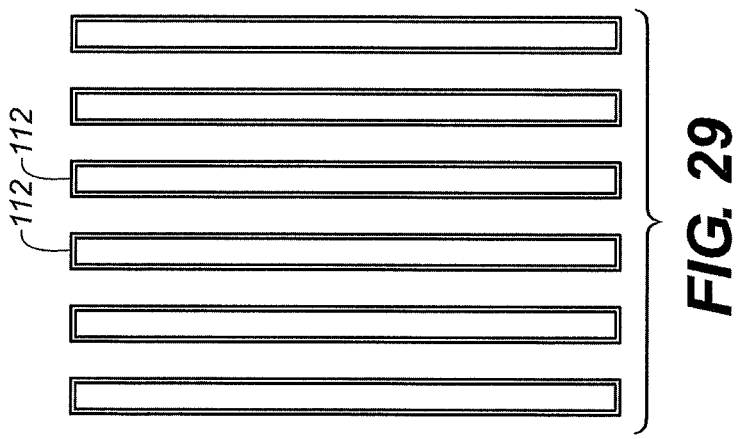
FIG. 29 is a plan view of multiple screen racks with square ends.
Figure 32:
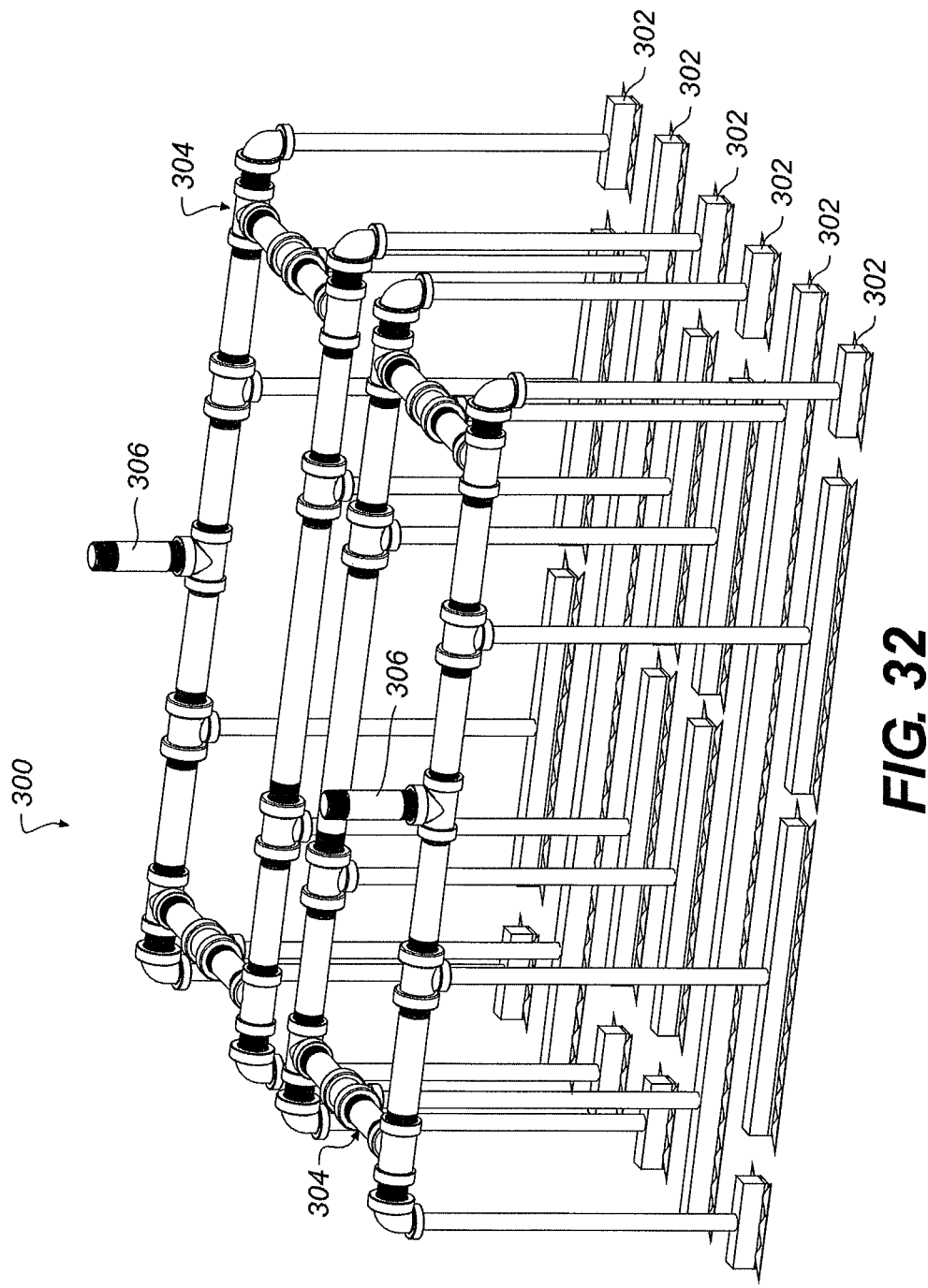
FIG. 32 is an isometric view of the spray header typically located inside a spray hood.
Figure 33:
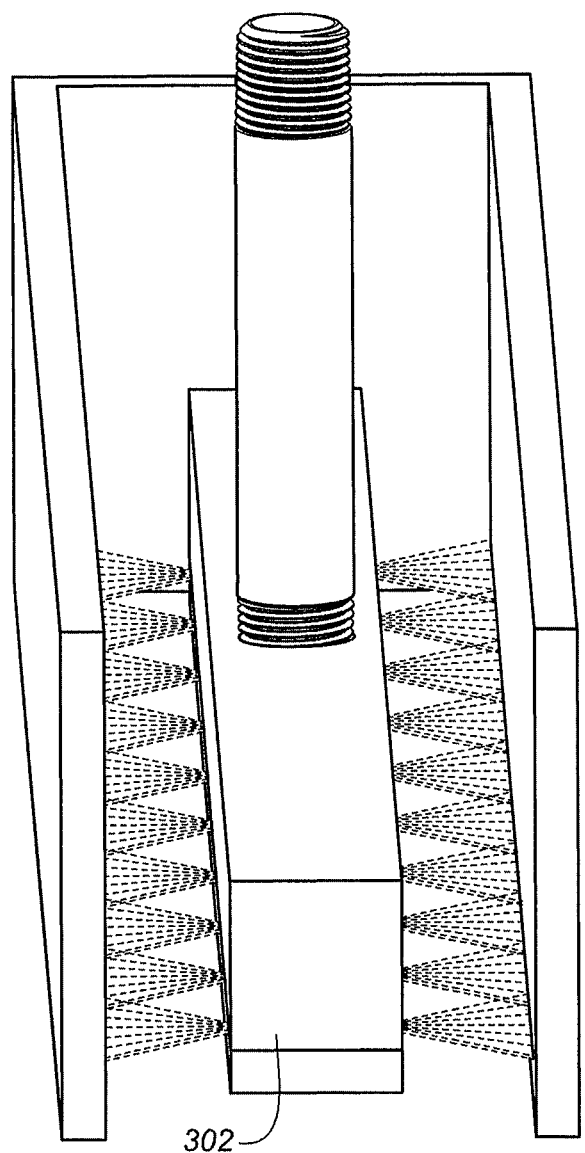
FIG. 33 is an isometric view of a spray bar having unique shaped orifices to send a horizontal fan of high pressure/low volume water to both inside faces of the screen box.
Figure 34:
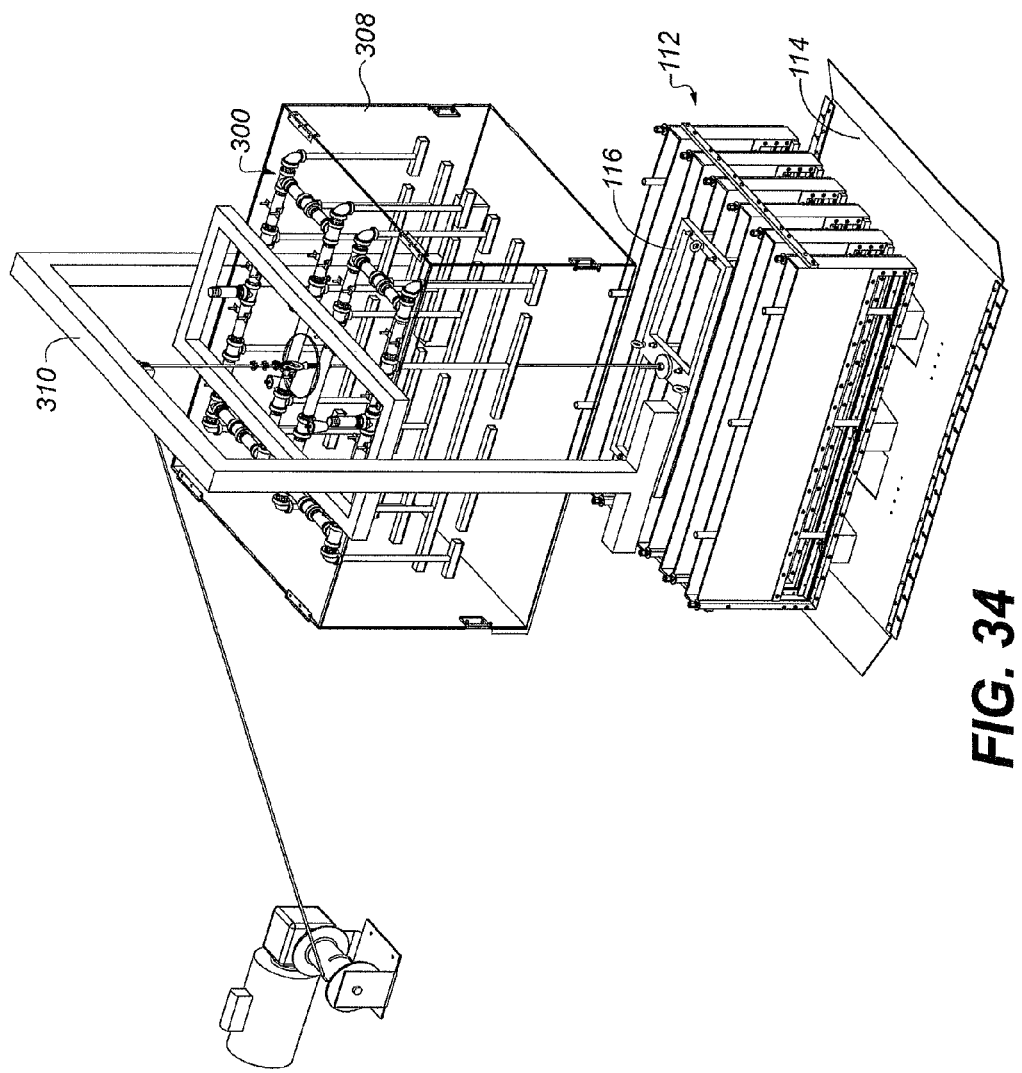
FIG. 34 is an isometric view of the backwash spray manifold and spray bars in the spray hood above a SBX having multiple screen racks.
Figure 35:
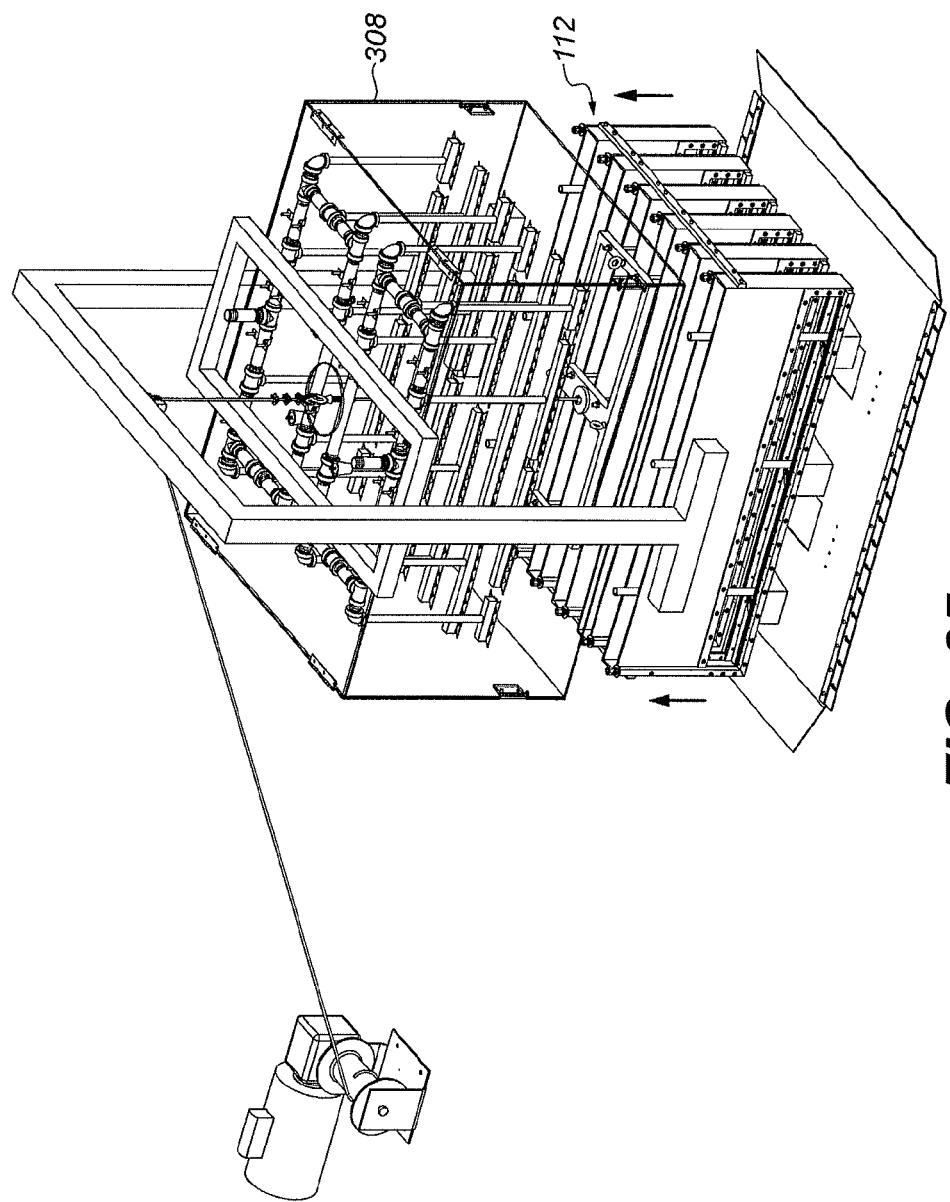
FIG. 35 is an isometric view showing the upward movement of the SBX into the spray hood. The backwash water is activated when the top of the screen reaches the spray bar elevation and continues to backwash the SBX as it slowly rises in the spray hood and then shuts off when the bottom of the screen reaches the spray bar elevation.
Figure 36:
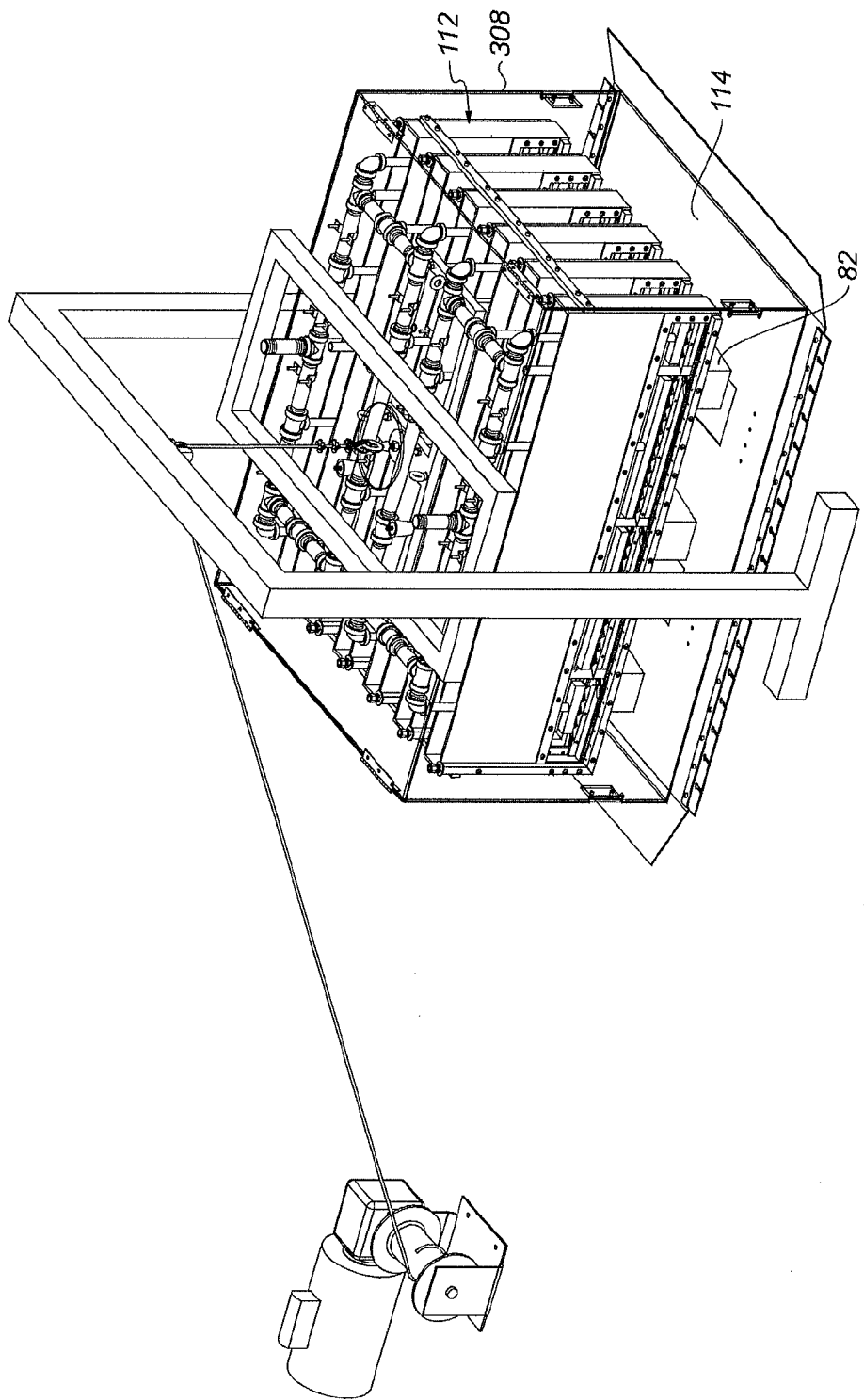
FIG. 36 is an isometric of the multiple rack SBX inside the spray hood.
Figure 37:
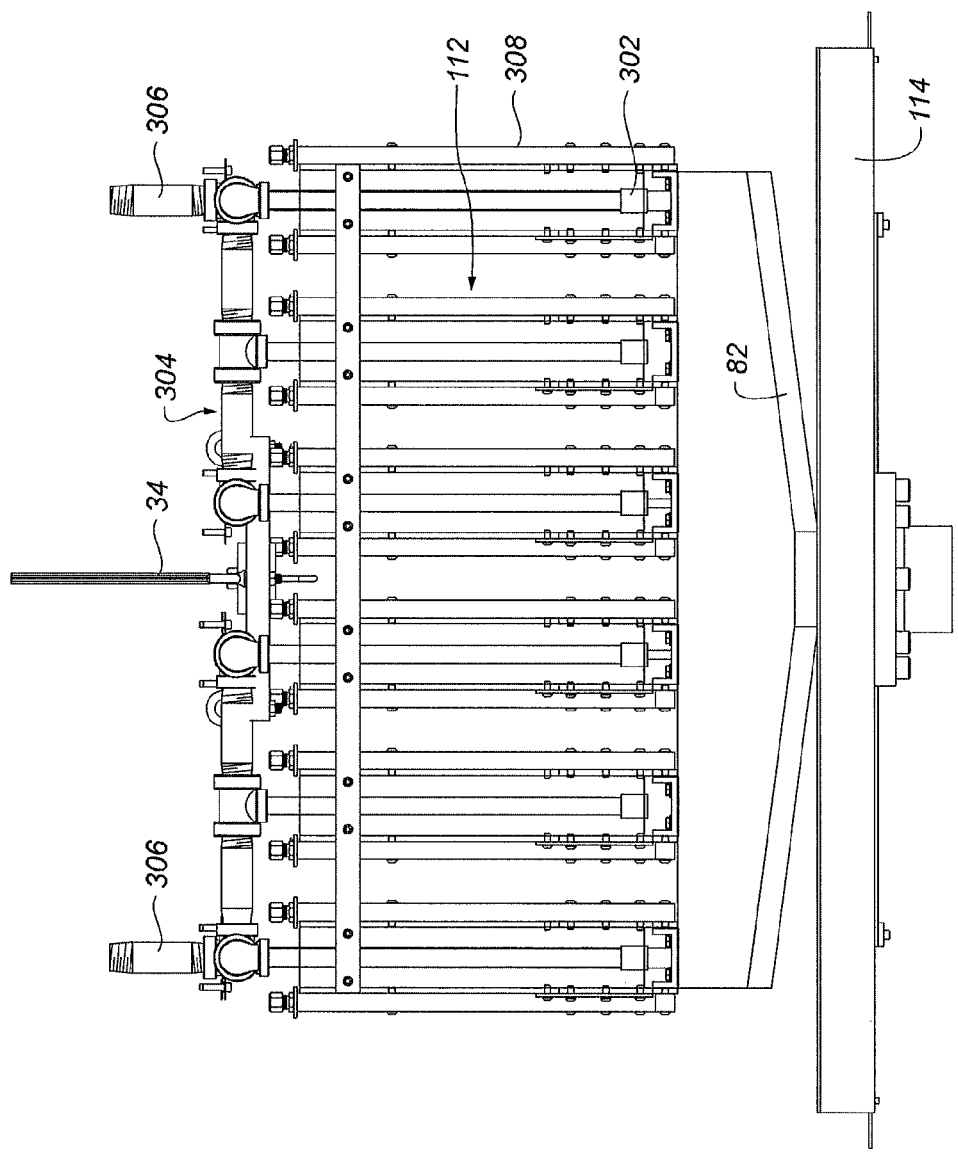
FIG. 37 is a cross-section view showing the spray bar and backwash manifold positioned inside the screen racks of the SBX.

The application requires the screen racks be placed close together with limited space between the racks (FIGS. 29-31). This limited space can result in high horizontal velocities that would create uneven flow to and through the screen surface area, which uneven flow would result in fouling of high velocity areas of the screen. To create lower velocities and more uniform distribution of flow the screened surface of each rack is submerged with either a sealed top with air vents or an open top and solid vertical plates to enclose and seal the area above the screened surface. The LPSBX filtrate manifold 82 is connectible to flexible discharge hose 68. This is done to increase the pathways and cross sectional area of flow to the center of the elongated racks which lowers the velocities to the screen, and the enclosed volume above the racks serves to increase the volume of screened liquid to backwash the screen. There are multiple screen racks 112 mounted to LPSBX filtrate manifold 82, a deflector plate below 114, and a modular lifting frame 116.

The width of the rack 112 is determined by the open area between the rack and the filtrate manifold. The more open cross-sectional area connecting the rack to the manifold, the narrower the rack can be.

Referring to FIGS. 36-39, LPSBX filtrate manifold 82 comprises a central drain channel 83 terminating in an outlet 85 connectible to a flexible drain hose 68 (FIG. 13) via fitting 52 (FIG. 1) as just described. Central drain channel 83 is transected by a plurality of feeder channels 87 that drain into central drain channel 83. In turn, the multiple screen racks 112 transect and drain into feeder channels 87 via mating ports 89 that are sealed between racks 112 and channels 87.

Referring to FIGS. 29-31, the narrow vertical ends of the racks 112 may be rounded 12*a* or triangular 12*b* to reduce turbulence and promote laminar horizontal flow towards the center of the rack thus reducing vertical flows from top and bottom.

Referring now to FIGS. 32-37, LPSBX 112 is cleaned and sanitized in a manner similar to the cleaning of a single SBX 12 as described above.

A spray header assembly 300 comprises a plurality of spray elements 302 (equal to the number of SBXs) connected in parallel via piping 304 to one or more water inlets 306. Assembly 300 is mounted in a openable hood 308 that in turn is mounted to a framework 310 for attachment to a clarifier tank (not shown) containing LPSBX 112. Assembly 300 and LPSBX are aligned such that upon raising of the LPSBX the spray elements enter the LPSBX or SBX units, spraying the inside screen surface outward to displace solids on the exterior screen face. The raising and lowering cycle may be repeated as may be needed for proper cleaning of the screens. The cleaning effluent drains into the deflector plate 114 and through openings therein into the clarifier tank below.

Installation into a Prior Art System

Referring now to FIGS. 26-27*a*, an SBX system in accordance with the present invention may be installed in existing clarifiers 200 of conventional design or the new clarifier design. The preferred installation is the new clarifier design that comprises a single primary settling tank 202 that performs grit removal, flow equalization, primary clarification, and fine screening such as is disclosed in the above-incorporated US patents.

The location of the SBX 12 in a retrofit of a conventional clarifier is dependent on the size and shape of the clarifier tank, the configuration of the internal sludge and scum mechanisms, a mapping of the COD within the clarifier under different flow conditions, the settling characteristics of the solids, peak/average/minimum flows, and hydraulic profile. In some cases the existing sludge withdrawal mechanisms, scum troughs, and effluent weirs may need to be modified.

In the new style clarifiers, the SBX is placed in the center of the tank over the sludge hoppers, equal distance from the influent feed trough. This is done because most solids have settled in the center of the tank in the sludge hoppers as a result of feeding equal flow, equal distances from opposite sides of the tank towards the center, at equal velocities. The SBX deflector plate prevents the disturbance of the solids below the plate. There will be some slight disturbance of the light solids from the invention moving downward. These disturbed solids then must travel both vertically and horizontally around the deflector plate. This additional travel distance and time at a low exit velocity will reduce the amount of solids reaching the screen.

The SBX has several different configurations useful for different flow ranges, types of liquid being decanted, and new or old style clarifier.

The installation of the SBX into an existing clarifier requires modifications to the operation of the conventional clarifier to provide beneficial flow patterns similar to the new style clarifier. The influent flow is directed to the clarifiers that have a low liquid level. The clarifiers with a high liquid level are in the process of resting or decantation. This is accomplished by alternating the clarifier influent gates or valves from open to close through the inventions' control system. Actuators may be affixed to the existing gates or valves to allow automatic operation. Individual pumps dedicated to specific tanks may also be used.

There is no decanting or discharge during the fill cycle because energy imparted into the flowing liquid keeps the BOD in suspension. Preferably, after filling of the tank a rest period with no discharge allows the fluid inertia and energy to dissipate, improving the settling of the supracolloidal and colloidal solids. Such a rest period can assist in achieving solids removal levels of about 85%. The exception to this operational mode is during high flow events in which the sewage is highly diluted, having a lower solids and BOD concentration, than both tanks may be operated to handle the excessive volume of liquid. Currently such events wash the settled solids out of the clarifier and aeration tanks and into the receiving body of water or into the secondary treatment process. The physical barrier of the SBX contains the solids within the clarifier tank. There may also be redundant SBX systems within each clarifier tank that can be brought into operation to assist in screening of the excessive flow. This is automatically done via the SBX control system detecting and quantifying the excessive flow and deviations to normal or experienced flow patterns.

The SBX moves vertically with no pivot at the base discharge so there is no horizontal movement. This makes the horizontal footprint of the invention smaller so it can fit into narrow deep tanks.

FIGS. 26-26*a* show that a prior art pivoting weir 100 occupies a footprint that may be fully half of a clarifier tank. FIGS. 27-27*a* show that an SBX 12 in accordance with the present invention may occupy a footprint scarcely larger than the diameter of the SBX. In a clarifier retrofit, the pivoting weir 100 is simply removed at the pipe pivot joint 102 and replaced by connection of the collapsible SBX hose 68.

From the foregoing description, it will be apparent that there has been provided an improved decanter system for a wastewater clarifier. Variations and modifications of the herein described decanter system, in accordance with the invention, will undoubtedly suggest themselves to those skilled in this art. Accordingly, the foregoing description should be taken as illustrative and not in a limiting sense.

What is claimed is:

1. A weir-less decanter system for separating liquid from solids in an aqueous influent in a tank, comprising:
    a) a structure at least partially submersible in said aqueous influent in said tank, having screening extending over at least a portion of the outer surface of said structure and having an open interior, said structure defining an area within said tank, said structure including a water outlet and being constructed such that water cannot pass from outside of said structure to inside of said structure without passing through said screening,
    wherein said screening is also at least partially submersible in said aqueous influent such that filtration of said aqueous influent can occur at a variable and controllable range of immersion depths below the free surface of said aqueous influent;
    b) a driven vertical lifting mechanism attached to said structure capable of raising said structure linearly and solely vertically with respect to the free surface of said aqueous influent in said tank; and
    c) a control mechanism governing said driven vertical lifting mechanism capable of regulating the solely vertical position of said structure in said variable and controllable range of immersion depths and above the free surface of said aqueous influent in said tank.

2. A weir-less decanter system in accordance with claim 1 wherein said vertical lifting mechanism comprises a lifting column extending through a bottom and a top of said structure and being attached thereto, said lifting column being hollow and having openings exposed to said open interior.

3. A weir-less decanter system in accordance with claim 2 wherein said lifting column is a pipe, and further comprising a flexible hose connecting said lifting column to an effluent outlet control valve for said tank.

4. A weir-less decanter system in accordance with claim 1 wherein said control mechanism comprises a first pressure sensor within said structure, a second pressure sensor within said tank, an encoder within said tank, an effluent outlet control valve, a flow meter, and a programmable controller.

5. A weir-less decanter system in accordance with claim 1 wherein said structure is constructed generally in the form of a polyhedron having at least two sides constructed from screening.

6. A weir-less decanter system in accordance with claim 1 wherein said structure is constructed generally in the form of a cylinder having screening on the outer surface of said cylinder.

7. A weir-less decanter system in accordance with claim 1 wherein the shape of said structure is selected from the group consisting of rectangular, cylindrical, and frustum.

8. A weir-less decanter system in accordance with claim 1 further comprising a plurality of said structures arranged in parallel flow.

9. A weir-less decanter system in accordance with claim 2 further wherein said structure further comprises a deflector plate.

10. A weir-less decanter system in accordance with claim 1 further comprising a hood apparatus disposed over said tank for receiving and treating said structure.

11. A weir-less decanter system in accordance with claim 1 further comprising a manifold to collect screened liquid via sealed openings between a base of said structure and said manifold.

12. A weir-less decanter system in accordance with claim 11 wherein said manifold comprises a plurality of spaced-apart channels with open area between said channels to permit upward flow of unscreened liquid between said channels to said screen structure.

13. A weir-less decanter system in accordance with claim 10 further comprising apparatus disposed within said hood for cleaning and disinfecting said structure.

14. A method for separating liquid from solids in a tank, comprising the steps of:
  a) providing a weir-less decanter system comprising a structure at least partially submersible in said liquid in said tank, having screening extending over at least a portion of the outer surface of said structure for carrying out said separating and having an open interior, said structure defining an area within said tank, said structure including a liquid outlet for removal of screened liquid from within said structure and being constructed such that liquid cannot pass from outside of said structure to inside of said structure without passing through said screening; a driven vertical lifting mechanism attached to said structure for raising and lowering said structure linearly and solely vertically with respect to the free surface of said liquid in said tank; and a control mechanism governing said lifting mechanism for regulating the vertical position of said structure with respect to said tank, wherein said control mechanism includes a first pressure sensor within said structure, a second pressure sensor within said tank, an encoder within said tank, an effluent outlet control valve, a flow meter, and a programmable controller;
  b) determining a setpoint flow for effluent from said tank through said effluent outlet control valve;
  c) calculating an immersion depth for said structure in said liquid in said tank;
  d) immersing said structure to said calculated depth;
  e) monitoring output data from said first and second pressure sensors, said encoder, and said flow meter to determine the instantaneous flow through said effluent outlet control valve;
  f) adjusting as needed the vertical position of said structure with respect to a level of said liquid in said tank to maintain said calculated immersion depth; and
  g) adjusting said immersion depth and an opening of said effluent outlet control valve as needed to provide a desired flow rate of effluent through said flow meter.

15. A method in accordance with claim 14 further comprising the step of raising said structure vertically from said liquid in said tank to allow filtrate within said structure to back wash said screening.

16. A method in accordance with claim 14 further comprising the steps of:
  a) raising said structure into a hood;
  b) spray cleaning said structure within said hood; and
  c) disinfecting said structure within said hood.

17. A method in accordance with claim 16 comprising the further step of lowering said structure back to said immersion depth in said liquid.

18. A method in accordance with claim 14 comprising the further step of adding a coagulant to said liquid in said tank prior to said immersing step.

19. A method in accordance with claim 14 comprising the further step of providing a rest period wherein said liquids and solids in said tank are allowed to stand without agitation for a period of time prior to beginning flow through said structure by opening of said effluent outlet control valve.

* * * * *